US008682578B2

(12) United States Patent
Okude et al.

(10) Patent No.: US 8,682,578 B2
(45) Date of Patent: Mar. 25, 2014

(54) ROAD LINK STRING CONVERSION METHOD, ROAD INFORMATION PROVIDING DEVICE AND ROAD INFORMATION PROVIDING SYSTEM

(75) Inventors: Mariko Okude, Hitachi (JP); Hirofumi Komine, Yokosuka (JP); Kenji Suzuki, Tokyo (JP); Tomoaki Hiruta, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 4 days.

(21) Appl. No.: 13/033,631

(22) Filed: Feb. 24, 2011

(65) Prior Publication Data
US 2012/0143886 A1 Jun. 7, 2012

(30) Foreign Application Priority Data
Mar. 11, 2010 (JP) ................................. 2010-054948

(51) Int. Cl.
G01C 21/26 (2006.01)
G01C 21/32 (2006.01)
G06F 7/00 (2006.01)

(52) U.S. Cl.
USPC ............ 701/451; 701/400; 701/533; 707/756

(58) Field of Classification Search
USPC .......................... 701/451, 409, 533; 707/756
See application file for complete search history.

(56) References Cited

U.S. PATENT DOCUMENTS

| 6,047,234 | A  | * | 4/2000  | Cherveny et al. | 701/451 |
| 6,636,802 | B1 | * | 10/2003 | Nakano et al.   | 701/532 |
| 8,417,442 | B2 | * | 4/2013  | Johnson et al.  | 701/118 |
| 2003/0132862 | A1 | * | 7/2003  | Kurosawa        | 340/995.1 |
| 2005/0027447 | A1 | * | 2/2005  | Hirose et al.   | 701/210 |
| 2005/0131631 | A1 | * | 6/2005  | Nakano et al.   | 701/200 |
| 2006/0161344 | A1 | * | 7/2006  | Iwahori et al.  | 701/211 |
| 2007/0032949 | A1 | * | 2/2007  | Arai et al.     | 701/211 |
| 2007/0073471 | A1 | * | 3/2007  | Abe             | 701/200 |
| 2007/0273555 | A1 | * | 11/2007 | Amano           | 340/935 |
| 2008/0077324 | A1 | * | 3/2008  | Hatano et al.   | 701/212 |
| 2010/0106410 | A1 |   | 4/2010  | Adachi et al.   |         |

FOREIGN PATENT DOCUMENTS

| JP | 2001-41757 A | 2/2001 |
| JP | 2002-328034 A | 11/2002 |
| JP | 2003-121170 A | 4/2003 |
| JP | 2003-295765 A | 10/2003 |
| JP | 2004-125507 A | 4/2004 |
| WO | WO 2010/000706 A1 | 1/2010 |

OTHER PUBLICATIONS

The Extended European Search Report dated May 30, 2012 (Eight (8) sheets).

* cited by examiner

Primary Examiner — Thomas Black
Assistant Examiner — Tyler Paige
(74) Attorney, Agent, or Firm — Crowell & Moring LLP

(57) ABSTRACT

A road link string conversion method for converting first road link string data included in first map data into second road link string data included in second map data: deciding whether or not first coordinates-of-position strings corresponding to the first road link string data correspond to the second road link string data; constructing a second coordinates-of-position string by combining together the first coordinates-of-position strings decided as not corresponding to the second road link string data; establishing correspondence between the second coordinates-of-position string and the second road link string data; and converting the first road link string data including the first coordinates-of-position strings decided as not corresponding to the second road link string data, to the second road link string data to which the second coordinates-of-position string corresponds.

8 Claims, 14 Drawing Sheets

FIG.2
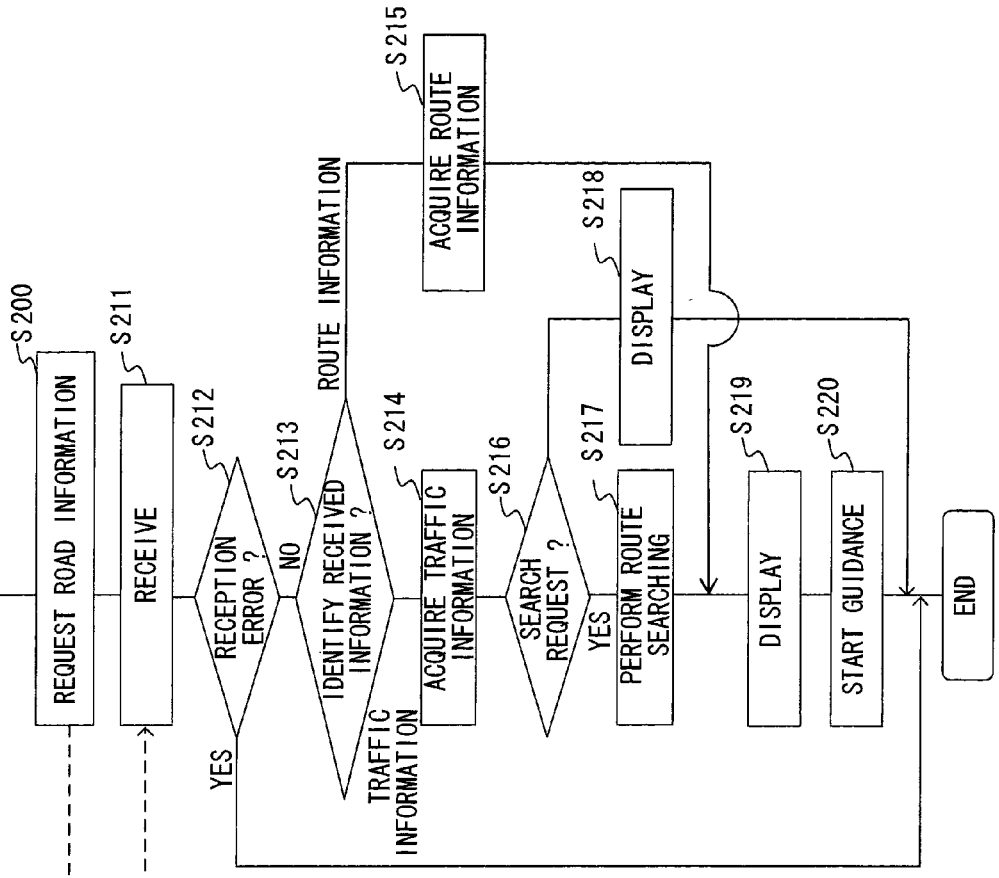
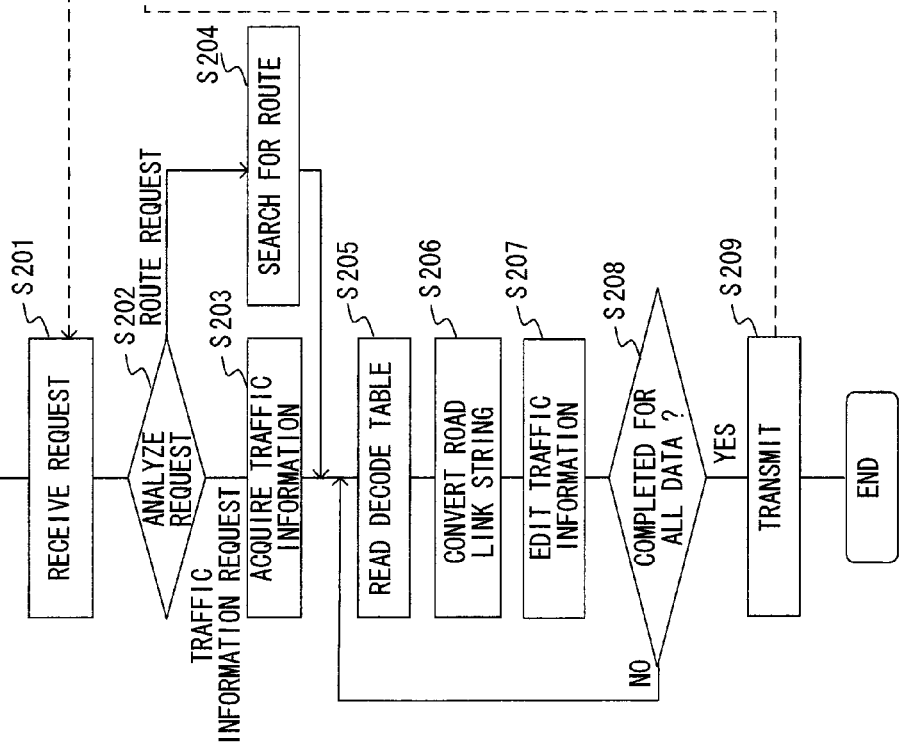

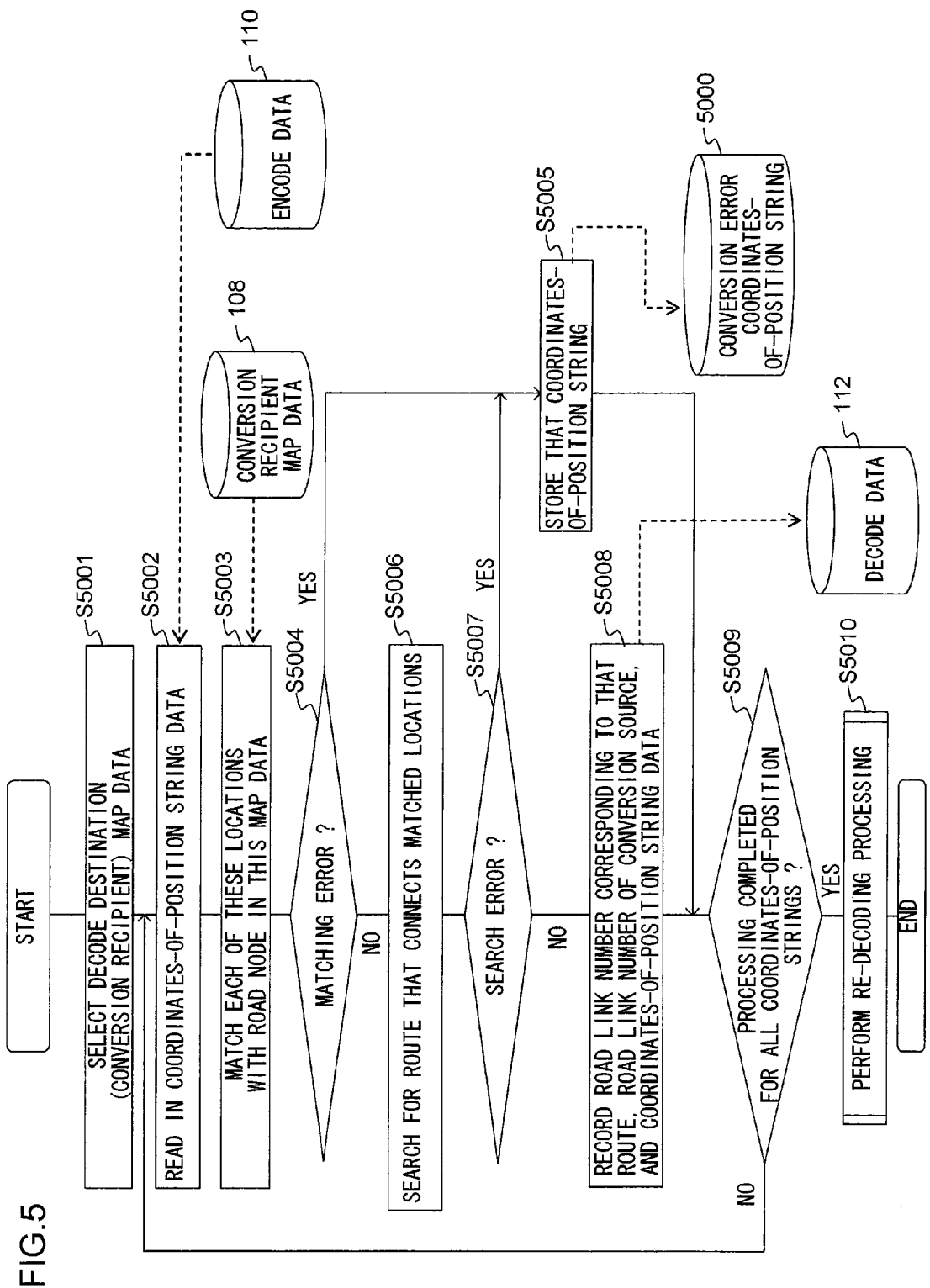

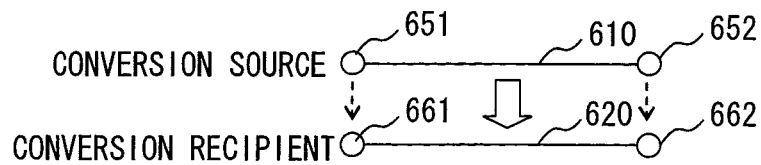
FIG.6A
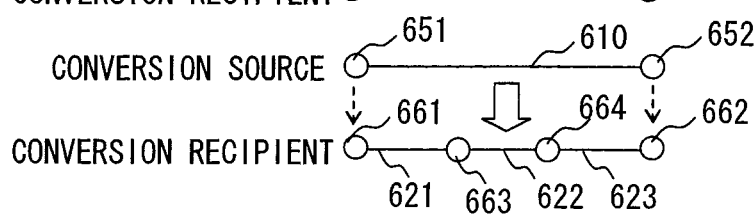
FIG.6B
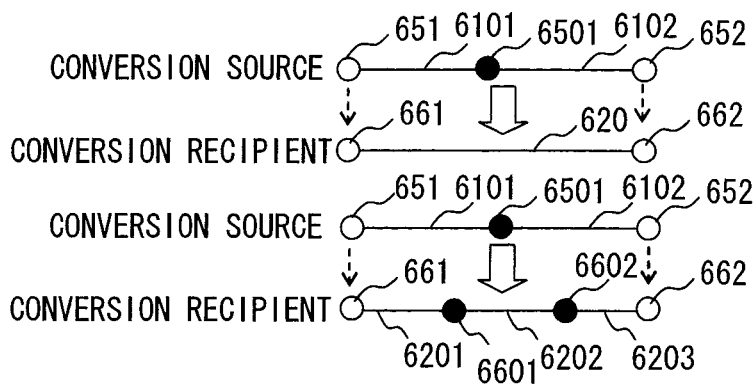
FIG.6C
FIG.6D
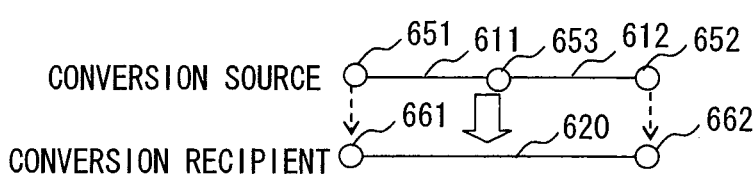
FIG.6E
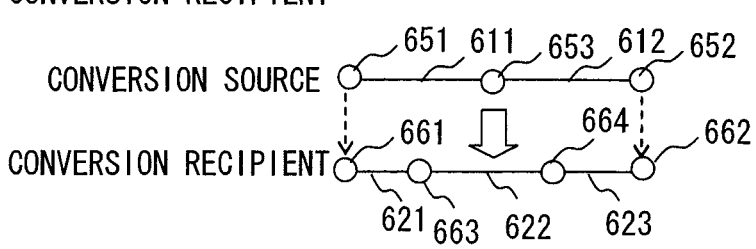
FIG.6F

FIG.9A

Table 901:

| ENCODED CONVERSION LINK ID | MESH CODE | ROAD LINK NUMBER OF CONVERSION SOURCE | COORDINATES-OF-POSITION STRING AND PROPERTY INFORMATION |
|---|---|---|---|
| EID-1 | M1 | L01, L02 | (X1, Y1, C1) + (X2, Y2, C2) + (X3, Y3, C3) + (X4, Y4, C4) + (X5, Y5, C5) |
| EID-2 | M1 | L03 | (X6, Y6, C6) + (X7, Y7, C7) |
| ... | ... | ... | ... |

FIG.9B

Table 902:

| DECODED CONVERSION LINK ID | MESH CODE | ENCODED CONVERSION LINK ID | ROAD LINK NUMBER OF CONVERSION RECIPIENT | COORDINATES-OF-POSITION STRING AND PROPERTY INFORMATION |
|---|---|---|---|---|
| DID-1 | M1 | EID-1 | LC1, LC2, LC3 | (X1, Y1, C1) + (X2, Y2, C2) + (X3, Y3, C3) + (X4, Y4, C4) + (X5, Y5, C5) |
| DID-2 | M2 | EID-2 | LC4 | (X6, Y6, C6) + (X7, Y7, C7) |
| ... | ... | ... | ... | ... |

ROAD LINK STRING CONVERSION METHOD, ROAD INFORMATION PROVIDING DEVICE AND ROAD INFORMATION PROVIDING SYSTEM

INCORPORATION BY REFERENCE

The disclosure of the following priority application is herein incorporated by reference: Japanese Patent Application No. 2010-054948 filed Mar. 11, 2010.

BACKGROUND OF THE INVENTION

1. Field of the Invention

The present invention relates to a road information providing device and a road information providing system with which, by data transfer being performed via communication between devices that hold different map data, for example between a terminal device and a server device of a navigation system, it is possible for the terminal device to utilize the most up-to-date information available upon the server device.

2. Description of Related Art

Navigation devices are per se well known and widespread that receive the most up-to-date information from an external communication center via a broadcast or via a communication device, and that obtain a route to a destination while taking into account this most up-to-date information. For example, as one of its basic functions, a navigation device may be provided with the function of receiving the newest traffic information, such as information about congestion or about traveling times or the like, in the form of an FM multiplex broadcast or the like provided from a traffic information center, and with a route guidance function of calculating the shortest time route to a destination using this traffic information. Moreover recently, in order to be able to forecast the time point of arrival at the destination more quickly and with better accuracy, and in order thus to arrive at the destination more efficiently, it has also been per se arranged for a navigation device to acquire from an information center predicted traffic information at the time point that it is predicted that the vehicle will pass, and for the navigation device, using this, to calculate and guide a route to the destination for which the time required will be a minimum. Moreover, there is also a per se known type of navigation system in which it is arranged for an optimum route calculated by an information center and reflecting the newest traffic information to be transferred to a navigation device, that then guides the vehicle along this optimum route to the destination.

This process need not be limited to traffic information; there is a movement to enrich navigation services by downloading to the terminal voluminous and moreover up-to-date information held on an external site. For example, property information such as route information to the destination, a recommended time for departure, possible locations for taking breaks, and so on may be provided at the user's home by a portal that supports journey planning, in consideration of the most up-to-date information such as ongoing changes related to facilities, charges for the use of roads, the level of usage of facilities, event information, and so on. A service also exists with which it is also possible, in order to guide the vehicle along a recommended route to its destination, to take advantage of information about a journey that has been planned upon a portal site, and that has been transferred to the navigation device via a removable medium or by electronic communication.

For road information that includes traffic information and/or route information to be used in common by both the center and by the navigation device, it is necessary for common position information to be handled by both devices. However, the navigation device is not necessarily limited to using the same type of map data (i.e. the same format for expressing positions) as the center. Moreover, even they both use the same type of map data, if their versions of the map data are different, then it is not necessarily the case that they will be able to use the same representation numbers (i.e., road link numbers) in common for road shapes and/or road positions.

Thus, with the VICS (Vehicle Information and Communication System) system, traffic information is provided by allocating unique numbers (VICS link numbers) to road sections (road links) for specifying roads that correspond to traffic information. In the navigation device, it is specified to which road the information that has been received corresponds, by using a correspondence table between road links of the map data maintained in the navigation device and VICS link numbers.

However, such VICS link numbers may not correspond to all of the roads of the map data held by the navigation device. Thus, since traffic information is not provided for roads for which VICS link numbers are not defined, accordingly there is a possibility of encountering congestion that has not been predicted on this type of road for which no VICS link number is as yet defined, and this entails a possibility of great variation from the forecast traveling time to the destination.

As a method for specifying the positions of a road to which no VICS link number is allocated, there is the method of using a coordinates-of-position string based upon latitudes and longitudes.

For example, in Japanese Laid-Open Patent Publication 2001-41757, there is disclosed a method of using a coordinates-of-position string as a method of position specification between maps that differ, in which a terminal device specifies a road section by determining its road shape from a coordinates-of-position string that is sent from a center, and by performing shape matching processing to search for a section over which the road shape that has been determined and the road shape of the map in the terminal agree with one another.

Furthermore, in Japanese Laid-Open Patent Publication 2003-121170, there is disclosed a method in which a center specifies and transmits road information to be provided, and/or a road link that specifies locations correlated with that road information, as a coordinates-of-position string that includes the start and end points of that road link, and in which the terminal device that receives this coordinates-of-position string specifies the road link that it describes as a road link on a terminal map, by using the coordinate values of that coordinates-of-position string sent from the center and the length and/or the azimuth of the line that joins its start and end points, and so on.

SUMMARY OF THE INVENTION

Since, according to the method disclosed in Japanese Laid-Open Patent Publication 2001-41757 and Japanese Laid-Open Patent Publication 2003-121170, the road section is expressed as a coordinates-of-position string, accordingly it does not depend upon map data, so that this method is effective for being able to specify a position upon any map. However, there is the accompanying demerit that the size of the code for expressing the position information becomes much greater, as compared to a link number format such as VICS. Consequently, to give consideration to the provision of traffic information, in order to provide the traffic information necessary for map display or for an area to be searched, it is necessary to express a plurality of road links that are present in that area as coordinates-of-position strings and to transmit them to the navigation device. Due to this, the amount of data to be distributed increases remarkably.

According to the AGORA-C method that is currently progressing towards becoming an international standard, a coordinates-of-position string is composed of the start and end points of a road section and a minimum necessary number of interpolated points for specifying that road section. By establishing correspondence of these start and end points and interpolated points to road nodes or a road link on the terminal map, a route from the start point to the end point via the interpolated points is calculated by the terminal device, and this route is put in correspondence with the road link on the terminal map.

In order for no delay to occur during guidance for travel, high processing responsiveness is demanded from the navigation device. Due to this, it is desirable to employ a method that imposes as little load as possible on the side of the terminal device, within the constraints of practicability. However with prior art methods that employ a coordinates-of-position string in the AGORA-C method, the method disclosed in Japanese Laid-Open Patent Publication 2001-41757, the method disclosed in Japanese Laid-Open Patent Publication 2003-121170 and the like, it is necessary to execute processing (hereafter termed "decoding processing") on the side of the terminal device for establishing a correspondence between the coordinates-of-position string that has been received and a road link upon the terminal map. Because of this, there is the problem that the processing load upon the terminal device increases. In particular the processing load increases when receiving traffic information, since it is necessary to repeat decoding processing for a plurality of coordinates-of-position strings.

According to the 1st aspect of the present invention, a road link string conversion method executed by a computer, in which a road link string conversion process converts first road link string data included in first map data stored by a storage device into second road link string data included in second map data stored by the storage device comprises: deciding whether or not first coordinates-of-position strings corresponding to the first road link string data correspond to the second road link string data; constructing a second coordinates-of-position string by combining together the first coordinates-of-position strings decided as not corresponding to the second road link string data; establishing correspondence between the second coordinates-of-position string and the second road link string data; and converting the first road link string data including the first coordinates-of-position strings decided as not corresponding to the second road link string data, to the second road link string data to which the second coordinates-of-position string corresponds.

According to the 2nd aspect of the present invention, in the road link string conversion method according to the 1st aspect, it is preferred that the first coordinates-of-position strings, for which it has been decided that they do not correspond to the second road link string data, include coordinates of position not to establish correspondence with nodes corresponding to the second road link string data, or coordinates of position for which, although correspondence has been established with the nodes, a failure has occurred in route searching between the nodes; and the second coordinates-of-position string includes coordinates of position that correspond to the nodes corresponding to the second road link string data, for which route searching between the nodes has been successful.

According to the 3rd aspect of the present invention, in the road link string conversion method according to the 1st aspect, it is preferred that the second coordinates-of-position string includes a coordinates-of-position string to which a plurality of coordinates-of-position strings, corresponding to the first coordinates-of-position strings decided as not corresponding to the second road link string data, are combined via same coordinates of position.

According to the 4th aspect of the present invention, a road information providing device comprises: a storage unit that stores first map data and second map data that is different from the first map data; a road link string data conversion unit that decides whether or not first coordinates-of-position strings corresponding to first road link string data included in the first map data correspond to second road link string data included in the second map data, and, by putting a second coordinates-of-position string, in which the first coordinates-of-position strings decided as not corresponding to the second road link string data are combined together, in correspondence with the second road link string data, converts the first road link string data, including the first coordinates-of-position strings decided as not corresponding to the second road link string data, to second road link string data to which the second coordinates-of-position string corresponds; a road information editing unit that edits second road information corresponding to the second road link string data by first road information corresponding to the first road link string data being converted by the road link string data conversion unit; and a road information distribution unit that distributes the second road information.

According to the 5th aspect of the present invention, in the road information providing device according to the 4th aspect, it is preferred that the road information editing unit calculates a traveling time or an average speed for each second road link corresponding to the second road link string data by converting a traveling time or an average speed, obtained based upon the first road information, of each first road link included in the first road link string data, with the road link string data conversion unit, and includes the traveling time or the average speed for each second road link that has been calculated in the second road information.

According to the 6th aspect of the present invention, in the road information providing device according to the 4th aspect, it is preferred that if at least one first road link included in the first road link string data corresponds to a congested section obtained based upon the first road information, the road information editing unit includes congested section information corresponding to the at least one first road link and corresponding to at least one second road link included in the second road link string data by converting the first road information with the road link string data conversion unit, in the second road information.

According to the 7th aspect of the present invention, a road information providing system comprises: a server device and a terminal device. The server device comprises: a first storage unit that stores first map data and second map data that is different from the first map data; an identification information generation unit that decides whether or not first coordinates-of-position strings corresponding to first road link string data included in the first map data correspond to second road link string data included in the second map data, and, by putting a second coordinates-of-position string, in which the first coordinates-of-position strings decided as not corresponding to the second road link string data are combined together, in correspondence with the second road link string data, generates identification information specifying a correspondence relationship between the first road link string data corresponding to the second coordinates-of-position string and the second road link string data; a first road information editing unit that edits second road information by putting first road information corresponding with the first road link string data in correspondence with the identification information; and a road information distribution unit that distributes the identification information and the second road information. The terminal device comprises: a reception unit that receives the identification information and the second road information distributed from the server device; a second storage unit that stores the second map data; and a second road information editing unit that edits third road information by putting the second road information in correspondence with the second road link string data based upon the identification information.

According to the 8th aspect of the present invention, in the road information providing system according to the 7th aspect, it is preferred that at least one of the first road link string data and the second road link string data specified by the identification information corresponds to a plurality of road links.

According to the 9th aspect of the present invention, in the road information providing system according to the 8th, it is preferred that the server device further comprises: a counting unit that, when the identification information generation unit has not been able to specify the correspondence relationship between the first road link string data and the second road link string data, counts a number of second coordinates-of-position strings corresponding to the first road link string data; and a notification unit that, if the number of second coordinates-of-position strings counted by the counting unit exceeds a predetermined number, issues a notification to the terminal device having the second storage unit in which the second map data of a same type and a same version as a type and a version of the second map data stored by the first storage unit, inviting the terminal device to update the second map data.

BRIEF DESCRIPTION OF THE DRAWINGS

FIG. 2 shows the overall flow of processing in this road information providing system according to the first embodiment;

FIG. 5 shows a flow of decoding processing performed by the server device of the road information providing system according to the first embodiment, for explanation of a decoding procedure for establishing correspondence of a string of coordinates-of-position to a road link string of conversion recipient map data;

FIGS. 6A through 6F are supplementary figures for further explanation of the flow of decoding processing shown in FIG. 5;

FIGS. 9A and 9B show examples of the data format for encode data and decode data stored by the server device of the road information providing system according to the first embodiment;

DESCRIPTION OF THE PREFERRED EMBODIMENTS

First Embodiment

In the following, a first embodiment of the present invention will be explained in detail with reference to the drawings.

Figure 1:
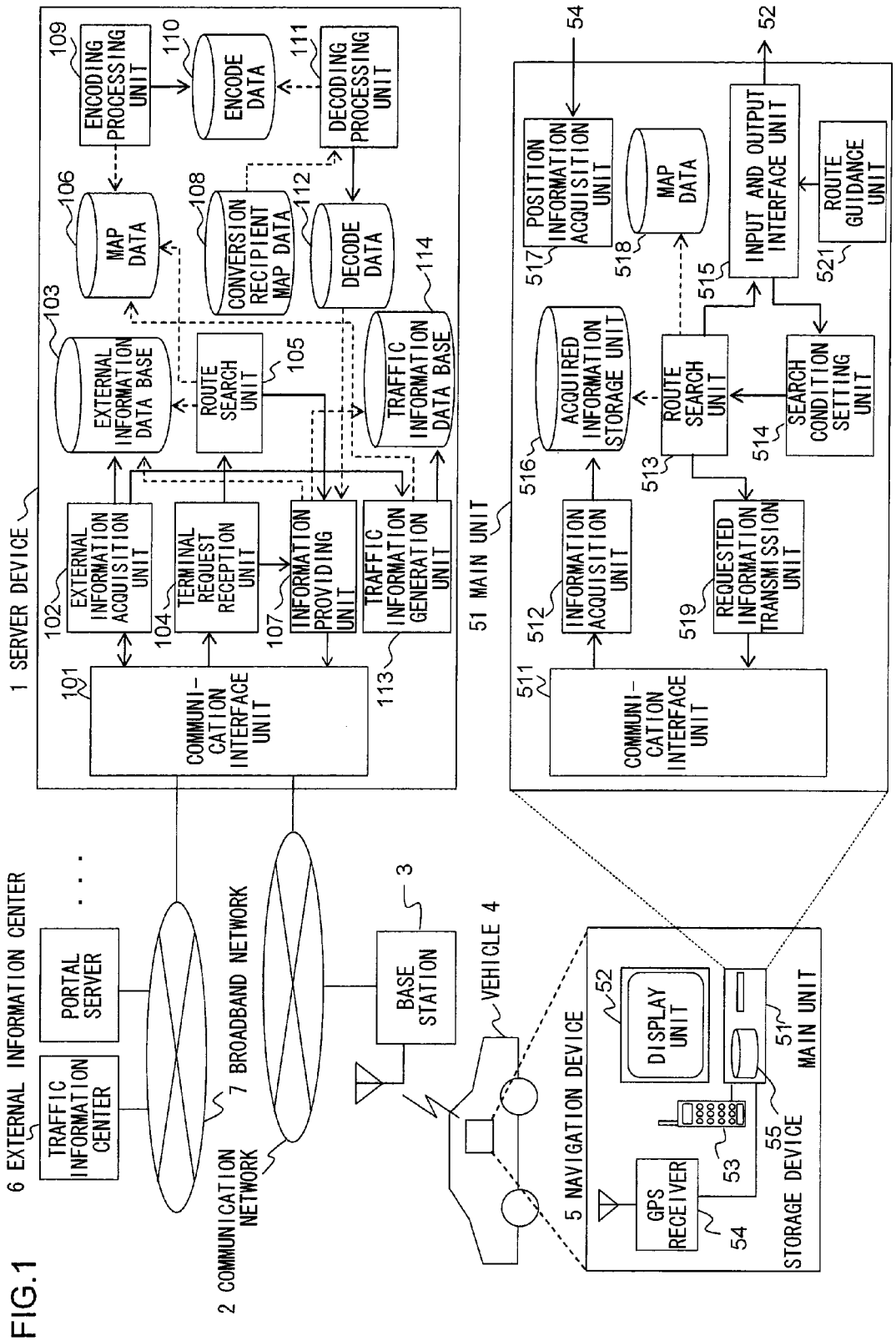
FIG. 1 shows the overall structure of a road information providing system according to a first embodiment of the present invention.

FIG. 1 is a figure showing the overall structure of a road information providing system according to a first embodiment of the present invention. This road information providing system includes a road information providing device and one or more terminal devices. In this embodiment, it is supposed that the road information providing device is a server device, and that the terminal devices are navigation devices. In FIG. 1, a server device 1 is connected to a communication network 2, and is connected to a navigation device 5 that is mounted in a vehicle 4 by wireless communication via a base station 3 such as a portable telephone or the like. Moreover, via a broadband network 7, the server device 1 is also connected to a traffic information center, and to an external information center 6 such as an external portal server or the like that provides to drivers information required for planning journeys and so on.

The server device 1 is built using a computer (i.e. an information processing device) that includes a CPU (Central Processing Unit), a memory device, a hard disk device, and so on. And functionally, as shown in FIG. 1, this server device 1 includes the following functional blocks: a communication interface unit 101, an external information acquisition unit 102, an external information data base 103, a terminal request reception unit 104, a route search unit 105, map data 106, an information providing unit 107, conversion recipient map data 108, an encoding processing unit 109, encode data 110, a decoding processing unit 111, decode data 112, a traffic information generation unit 113, a traffic information data base 114, and so on. It should be understood that the processing performed by these functional blocks is, in this embodiment, for example, implemented by the CPU executing a program that is stored in a semiconductor memory or on a hard disk device.

In FIG. 1, the external information acquisition unit 102 acquires various types of information from the external information center 6, such as traffic information and information relating to facilities and so on (including audio information and video image information), and accumulates this information in the external information data base 103. Moreover, the external information acquisition unit 102 acquires traveling data relating to the vehicle (including position information, the date and time of travel, the running speed and so on, and hereinafter referred to as probe data) from the external information center 6 or from the navigation device 5. And, on the basis of this probe data, the traffic information generation unit calculates the travelling time period and the level of congestion for each road link in the map data 106, and accumulates this information in the traffic information data base 114. The map data thus reflects information about newly constructed roads or facilities acquired from media or from the external information center 6, and the most up-to-date data is always stored.

The terminal request reception unit 104 receives requests transmitted from the navigation device 5, analyzes the contents of these requests, and transmits the results of these analyses to the route search unit 105 and/or to the information providing unit 107. At this time, the following information may be included in a request from the navigation device 5: a designation of requested information (i.e. a request command), the type and/or version of the map data that the terminal is using, the date and/or time of issue of that map data, a requested area, a position of the vehicle (or its point of departure), a destination, the anticipated date and/or time of travel, search conditions, and so on.

As the search conditions, generally, conditions such as whether to give priority to toll roads, whether to give priority to distance or to time, whether to give consideration to traffic circumstances, and so on may be accepted, but it would also be possible to accept other conditions, including an unclear condition that can be interpreted by the center in various ways, such as whether a route is popular or is recommended or the like. In this case, conversion processing is performed by the terminal request reception unit 104 in order to convert this condition from an ambiguous search condition to a concrete condition. In other words, a search key is generated from a term of expression obtained by conversion of the search condition into an expression of a type that can be concretely used for searching for information: for example, if the search condition is "popular route", then a search may be performed for a road upon which the frequency of travel is high, or if the search condition is "recommended route", then a search may be performed for a road that passes through locations for which the level of interest of users is high. If no information hitting the search key that has been generated is present in the external information data base 103, or if the most up-to-date information is necessary for the search, then, using this search key, the necessary information is obtained from the external information center 6 via the external information acquisition unit 102. The information that has been obtained is accumulated in the external data base 103. And it is arranged always to have available the most up-to-date version of information that changes over a comparatively short interval, such as traffic information or the level of utilization of a facility, or weather information or the like, and that moreover is frequently used as a route search condition, by periodically obtaining that information from the information center 6 and accumulating it in the external information data base 103.

The route search unit 105 receives a request that has been analyzed by the terminal request reception unit 104, acquires information required for route searching from the external information data base 103 and the map data 106, refers to the traffic information data base 114 that has been generated from the probe data, and calculates a recommended route from the departure point to the destination. Dijkstra's algorithm for obtaining the minimum cost route from the departure point through to the destination is generally used as the algorithm for route searching.

The encoding processing unit 109 and the decoding processing unit 111 convert road links in the map data 106 in order to make them match the map data of the recipient. The map data of the recipient is stored in advance in the conversion recipient map data 108. The encoding processing unit 109 converts a road link string managed by number in the map data 106 into a coordinates-of-position string, and accumulates an encode table in the encode data 110. And the decoding processing unit 111 establishes correspondence of the road link string expressed as a coordinates-of-position string and accumulated in the encode data 110 to a road link string in the conversion recipient map data 108, and stores in the decode data 112 a decode table, that is the correspondence data between the road link string in the map data 106 and the road link string in the conversion recipient map data 108.

As shown in FIG. 1, the navigation device 5 includes a main unit 51, to which a display unit 52, a portable telephone device 53, a GPS (Global Positioning System) receiver 54 and so on may be connected. Here, the main unit 51 is built as a compact computer that includes a storage device, i.e. a memory or a hard disk device. It should be understood that, instead of or in addition to the storage device 55, it would also be acceptable to provide a DVD (Digital Versatile Disk) drive or a transportable memory card or the like. The main unit 51 communicates with the portable telephone base station 3 via the portable telephone device 53, and is also connected to the server device 1 via the communication network 2. Instead of the portable telephone device 53, it would also be acceptable to establish connection to the server device 1 via a communication device such as a wireless communication device or the like.

The navigation device 5 is able to receive provision of road information from the server device 1 by requesting road information including traffic information or route information from the server device 1. This traffic information may include both traffic congestion information and traffic regulation information. This road information is outputted to the display unit 52 by the navigation device 5, and a route to the destination is calculated by the route search unit 513 using the aforesaid road information. It should be understood that it would also be acceptable to arrange for the road information that has been received to be outputted as audio by a speaker.

The main unit 51 includes the following functional blocks: a communication interface unit 511, an information acquisition unit 512, a route storage unit (acquired information storage unit) 516, a route search unit 513, a search condition setting unit 514, an input and output interface unit 515, a map data 518, a requested information transmission unit 519, a route guidance unit 521, and so on. This main unit 51, along with recording in the storage device 55 the traveling data (i.e. the probe data) such as the position information from the GPS receiver 54 (i.e. position information for the subject vehicle), the date and time of travel, the speed information and so on, also may include a functional block (not shown in the figures) that transmits this traveling data to the server device 1 via the portable telephone 53. It would also be acceptable to include a functional block (not shown in the figures) that provides probe data that has been accumulated to the server device 1 via a removable medium.

The information acquisition unit 512 is connected to the server device 1 via the communication interface unit 511, and requests road information, including traffic information for a required area, recommended route information, and/or other information, from the requested information transmission unit 519; and road information corresponding to this request from the server device 1 is acquired via the information acquisition unit 512, and is stored in the acquired information storage unit 516. The route search unit 513 searches for a route to the destination on the basis of the road information stored in the acquired information storage unit 516, user input information that is inputted from the input and output interface unit 515, vehicle position information obtained from the position information acquisition unit 517, and map information stored in the map data 518. And the route guidance unit 521 presents the road information obtained from the server device 1 and the recommended route outputted from the route search unit 513 to the user by display and/or audio with the input and output interface unit 515, and performs route guidance to the destination.

FIG. 2 shows the overall flow of processing of the road information providing system that includes the server device 1 and the navigation device 5.

From a request for traffic information or for route information or the like that has been inputted via the input and output interface unit 515, and from a destination or search conditions or the like, the navigation device 5 generates a road information request command, and issues this road information request command to the server device 1 (a step S200). Upon receipt of this road information request command from the navigation device 5 (a step S201), the server device 1 analyzes this road information request command (a step S202), and, if it indicates a request for traffic information, searches the external information data base 103, or searches the traffic information data base 114, and acquires the traffic information with the external information acquisition unit 102 (a step S203).

However, if the request command is a request for route information, then a recommended route to the destination is calculated by the route search unit 105 (a step S204) by referring to the departure point (usually, the current position), the destination, the search conditions and so on included in the request command. Since the traffic information or route information prepared as above is information in terms of road links in the map data 106, therefore, if the navigation device 5 holds map data 518 that is different from the map data 106, then, even if this road information using road links of the map data 106 were to be provided to the navigation device 5, the navigation device 5 would not be able to specify the position of the road links using this road information. Thus, the decode table is read (in a step S205) while referring to the decode data 112, and the road link string of the map data 106 is converted into a road link string of the map data 518 (in a step S206).

The stored decode data 112 includes conversion data of a plurality of links corresponding to the conversion recipient map data 108. To what type of map data road string this conversion is to be performed is decided on the basis of the type and version of the map data in the navigation device 5, and this is included in the requested information received from the navigation device 5. It would also be acceptable to arrange to specify the type of the map data by including type of device information relating to the navigation device 5 in the requested information, instead of by the type and the version of the map data. In this case, the server device 1 would store information specifying the correspondence between the type of the navigation device 1, and the type and the version of the map data of the navigation device 1. The road information (here, traffic information) transmitted appended to the road link string that has been converted on the basis of the type and the version of the map data included in the request information described above is generated using the traffic information of the road link string of the map data 106 (in a step S207). The processing of the steps S205 through S207 is repeated for all of the road link strings in the requested area (a step S208), and then the road information that has been generated is transmitted to the navigation device 5 (a step S209). This processing by the server device 1 then terminates.

The navigation device 5 receives the road information transmitted from the server device 1 with its communication interface unit 511 (a step S211). If there is an error during reception, then this fact is notified to the user, and processing terminates (a step S212). It would also be acceptable for processing not to be terminated directly, but for retry processing to be performed, and to be repeated once or more. If reception has succeeded, then the received information is identified by the information acquisition unit 512 (a step S213). Then the road information that has been acquired, that could include either traffic information or route information, is temporarily stored in the acquired information storage unit 516 (steps S214, S215). The road information that was received in the step S211 is information that corresponds to a road link string of the map data 518.

If traffic information has been received with the object of performing route searching (the step S214 and a step S216), then a recommended route to the destination is calculated using this traffic information that has been stored in the acquired information storage unit 516 (a step S217), the recommended route and traffic information are displayed (a step S219), and route guidance to the destination is started (a step S220). However, if route searching is not included, then the traffic information that has been acquired is displayed (a step S218), and then processing terminates. If route information has been acquired (the step S215), then the route information that has been acquired is information that corresponds to a road link string of the map data 518, and this route information is displayed upon the display unit 52 as the recommended route (the step S219), and guidance to the destination is started (the step S220). Then the navigation device 5 terminates this processing. But if no guidance information (i.e. information related to guidance points or right or left turn instructions or the like) was included in the route information that was acquired in the step S215, then guidance information for traveling along the route specified by this route information is generated on the basis of this route information and on the basis of map information stored in the map data 518.

In the above procedure, a service is assumed in which the server device 1 provides road information in response to a request from the navigation device 5. However, if a travel plan is being set up at home or at some other location using, not a navigation device 5, but some other terminal device such as a personal computer or a portable terminal or the like, then it would also be acceptable to arrange for this personal computer or portable terminal or the like to request road information from the server device 1. In this case, the server device 1 could also provide road information via a portal server. Moreover, it would also be acceptable to arrange to provide road information obtained by converting a map data road link string held by the server device 1 into a map data road link string held by the portal server. Even further, it would also be possible to provide road information obtained by converting a map data road link string held by the server device 1 into a map data road link string used by the navigation device 5, a personal computer, or a portable terminal.

Figure 3:
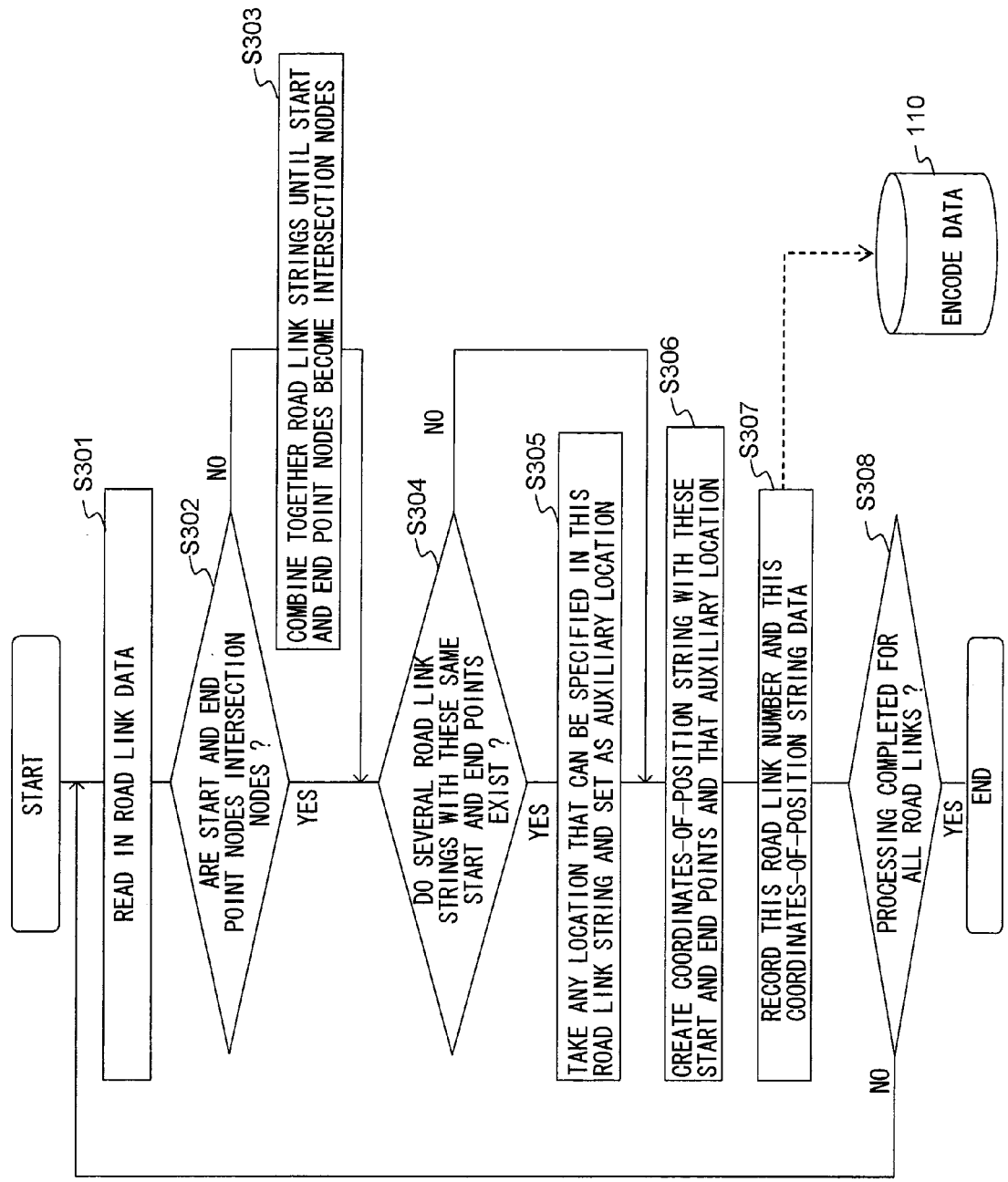
FIG. 3 shows a flow of encoding processing performed by a server device of the road information providing system according to the first embodiment, for explanation of an encoding procedure for converting a map data road link string into a string of coordinates-of-position.
Figure 4:
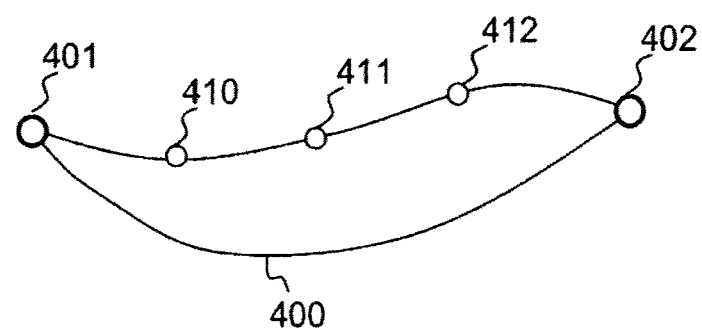
FIG. 4 is a supplementary figure for further explanation of the flow of encoding processing shown in FIG. 3.

FIG. 3 is a flow chart for the encoding processing, showing the procedure performed by the encoding processing unit 109 of the server device 1 for converting a road link string of the map data 106 into a coordinates-of-position string. And FIG. 4 is a supplementary figure for further explanation of the flow of encoding processing shown in FIG. 3. The encoding processing for a road link string will now be explained using FIGS. 3 and 4.

First, the road link data is read from the map data 106 (a step S301). Since the road link that corresponds to the road link data read in at this time is not necessarily limited to being a road section whose end points are intersection nodes, accordingly the node property information for the start and end point nodes of that road link is referred to, and a decision is made as to whether or not the start and end point nodes are intersection nodes (a step S302). If the start and end point nodes of that road link are not intersection nodes (NO in the step S302), then a new road link string is created (a step S303) that combines road links so that the end points become intersection nodes. For example, in FIG. 4, for the road section 401-402 of which the nodes at both its ends 401 and 402 are intersection nodes, due to the presence of the locations 410, 411, and 412 that are not intersection nodes, there are four road links, i.e. the section between the intersection node 401 and the location 410, the section between the location 410 and the location 411, the section between the location 411 and the location 412, and the section between the location 412 and the location 402. A road link string is constructed by combining these four road links together, with its two end nodes being the intersection node 401 and the intersection node 402, this being the road link string from the intersection node 401 via the location 410, the location 411, and the location 412 to the intersection node 402, and this road link string is taken as a unit for link conversion. Then a decision is made as to whether or not some other road link string exists whose start and end point nodes are the same as those of this road link string that has been created (a step S304). If a plurality of road link strings exist for the same section (YES in the step S304), then at least one auxiliary location for specifying the road link string is set in this road link string (a step S305).

In FIG. 4, there are two roads that connect together the intersection nodes 401 and 402: the road shown by the road link string via the locations 410, 411, and 412, and the road shown by the road link 400. In order to specify which of these two roads is meant, an auxiliary location is provided in each of these two roads. For example, when specifying the former road link string, any of the locations 410, 411, or 412 may be specified as an auxiliary location; and it would also be acceptable to set the auxiliary location to any position upon any road link that is included in that road link string. While in the previous explanation it was supposed that the locations 410, 411, and 412 were not intersection nodes, it would also be acceptable for the locations 410, 411, and 412 to be intersection nodes. For the decoding processing to be described hereinafter, it would be acceptable to arrange to add to the aforementioned auxiliary location property information corresponding to setting the above auxiliary location from an intersection node, or to setting it from a location that is not an intersection node, for example from a link interpolation point. A coordinates-of-position string is made from the start and end points of this road link string (or the road link 400) and the auxiliary location (a step S306), and then an encode table that, as shown in FIG. 9A, includes the link numbers of the road links that are included in this road link string and the coordinates-of-position string data that has been created is recorded in the encode data 110 (a step S307). Coordinates-of-position string data is created for all of the road links of map data 106 in a similar manner, and then this encoding processing terminates (a step S308). And link property information such as classification information as to whether or not the road section in question is a national road or a county road or the like, its road number or its road name, whether it is a tunnel or a separated carriageway, and so on is appended to the coordinates-of-position data string as attached information for specifying this road section.

FIG. 5 is a decoding processing flow chart, and shows the flow of decoding processing performed by the decoding processing unit 111 of the server device 1 for establishing correspondence of the coordinates-of-position string to conversion recipient map data 108, on the basis of the encode table stored in the encode data 110. This decoding processing for the coordinates-of-position string will now be explained in the following using FIG. 5.

First, map data is selected to be the subject of decoding (a step S5001) from the conversion recipient map data 108 in which is stored the map data for a plurality of types of maps and for a plurality of versions of maps. Next, the coordinates-of-position string data held for each road section is read in from the encode data 110 (a step S5002). Each of the locations that make up this coordinates-of-position string expressed by this coordinates-of-position string data is put into correspondence (a step S5003) with a road link or a node of the conversion recipient map data 108, using coordinate values and property information such as road classification and so on attached to the coordinates-of-position string. In concrete terms, an area (i.e. a mesh) is selected that includes the coordinates-of-position (i.e. the latitude/longitude pairs) that make up this coordinates-of-position string, and in this area, taking as subject the road data corresponding to the road classification of this coordinates-of-position string, a road link ID is sought which takes as its two end points the closest nodes to the coordinates of each of two end points of this coordinates-of-position string. If an auxiliary location is included in this coordinates-of-position string, then the road node or the road link that is closest to the coordinates-of-position of that auxiliary location is searched for. At this time it would also be acceptable to arrange, during the encoding, to determine whether to look for a link or for a node that is closest to the auxiliary location, according to the property information described above that is appended to that auxiliary location.

For a coordinates-of-position string for which a failure in matching has occurred (YES in a step S5004), the conversion error coordinates-of-position string 5000 is stored (a step S5005), the next coordinates-of-position string is read in, and matching processing to the road links of the conversion recipient map data 108 is performed in a similar manner to that described above. But for a location string for which the matching has succeeded (NO in the step S5004), the node points at both ends that matched, or the link ID (with a direction according to the order of the coordinates-of-position string) are taken as start point and end point, a route via the auxiliary location is searched for, and a road section that corresponds to the coordinates-of-position string is specified (a step S5006). It should be understood that the conversion error coordinates-of-position string 5000 is created in the storage region of the server device 1.

Figure 7:
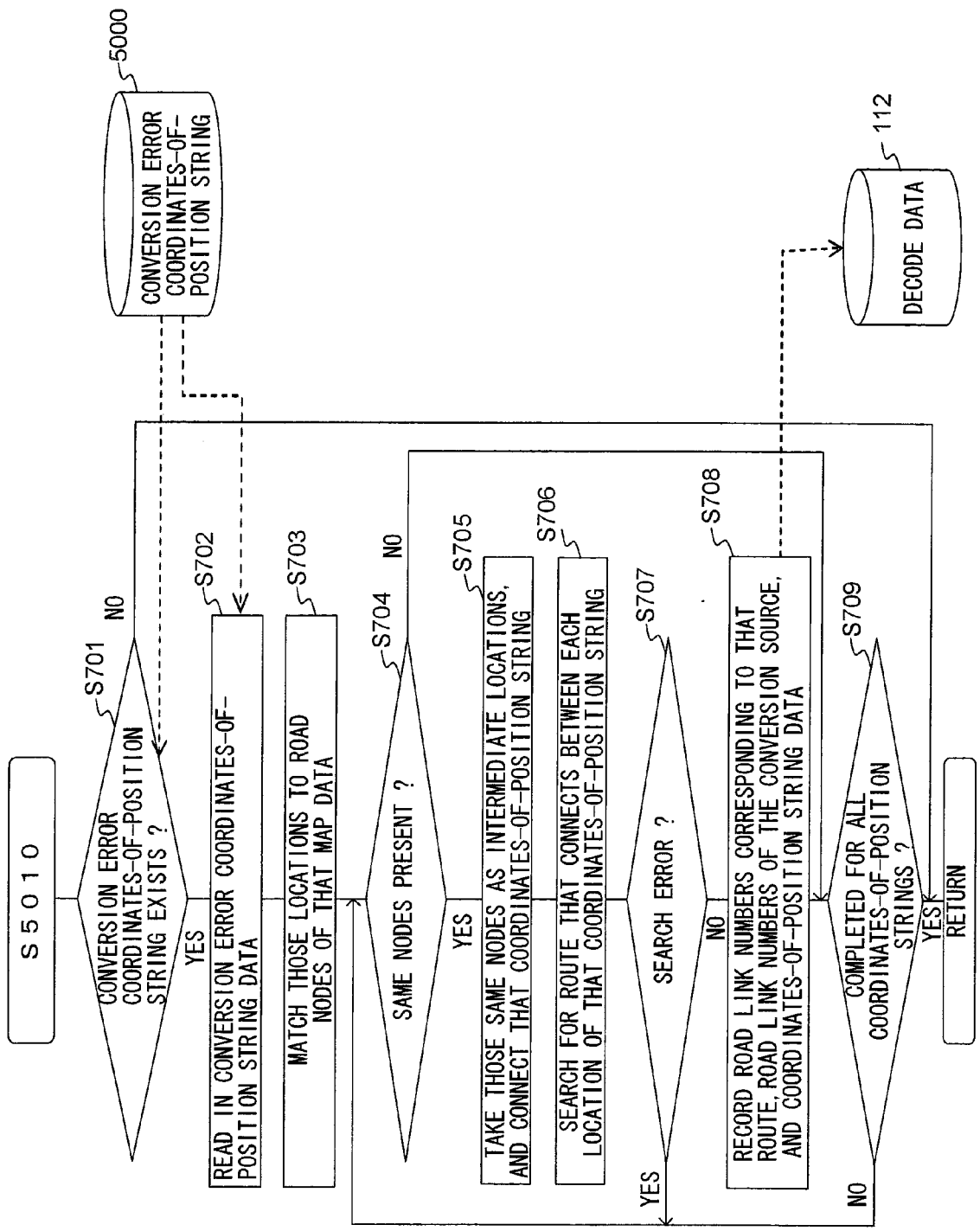
FIG. 7 shows a flow of re-decoding processing performed by the server device of the road information providing system according to the first embodiment, for explanation of a re-decoding procedure for establishing correspondence of a string of coordinates-of-position to a road link string of conversion recipient map data.

If no route from that start point to that end point can be found (YES in a step S5007), then that coordinates-of-position string is stored in the conversion error coordinates-of-position string 5000 (in the step S5005). The distance of the road section that corresponds to that coordinates-of-position string, being included in the property information of that coordinates-of-position string, is compared with the distance of the search route, and, if the difference between them is greater than a predetermined value, then it is determined that the road section is a different one from the road section provided by the server device 1, and it is decided that a search error has occurred. In this case as well, in the step S5005, that coordinates-of-position string is recorded in the conversion error coordinates-of-position string 5000. If a road link string (i.e. a road section) has been found by the route searching that corresponds to the coordinates-of-position string (NO in the step S5007), then a decode table including the coordinates-of-position strings corresponding to the road link numbers before conversion and after conversion is recorded in the decode data 112 (a step S5008). The processing of the steps S5002 through S5008 is repeated for all of the coordinates-of-position strings (a step S5009), and then this decoding processing terminates after re-decoding processing (a step S5010) has been completed, details whereof are shown in FIG. 7.

FIGS. 6A through 6F are supplementary figures for further explanation of the step S5006. Using these FIGS. 6A through 6F, various cases when, in the step S5006, it is possible to specify a road section of conversion recipient map data corresponding to the coordinates-of-position string created from the road links in the map data 106, and when it is not possible to specify such a road section, will be explained in the following.

The cases shown in FIGS. 6A through 6D are cases in which, in the step S5006, it is possible to specify a road section that corresponds to the coordinates-of-position string, and it is possible to decode that coordinates-of-position string.

The case #1 shown in FIG. 6A is an example in which a road link 610 of the map data 106 that is the conversion source and a road link 620 of the conversion recipient map data mutually correspond one-to-one at both ends, i.e. at intersection nodes 651 and 661 that both denote the same intersection, and also at intersection nodes 652 and 662 that both denote the same intersection.

The case #2 shown in FIG. 6B is an example in which a road link 610 of the map data 106 that is the conversion source and a plurality of road links 621, 622, and 623 correspond. The road link 621 has intersection nodes 661 and 663 at its two ends; the road link 622 has intersection nodes 663 and 664 at its two ends; and the road link 623 has intersection nodes 664 and 662 at its two ends. Due to the route search processing (of the step S5006) for a route that connects between the start and end point intersection nodes 661 and 662 of the road link 620, it is possible to establish a correspondence of the road link 610 to the road link string that includes the road links 621, 622, and 623.

The case #3 shown in FIG. 6C is an example in which, in the map data 106 that is the conversion source, a road link 6101 that connects between an intersection node 651 and an interpolated point node 6501, and a road link 6102 that connects between the interpolated point node 6501 and an intersection node 652, correspond to a road link 620 in the conversion recipient map data 108. Since, in this encoding processing 109, it is arranged for a coordinates-of-position string to be made with a road link string that has the intersection nodes as its start and end points (the step S303), accordingly a coordinates-of-position string that is made as a road link string including the road links 6101 and 6102 is stored in the encode data 110. By establishing correspondence of the start point intersection node 651 and the end point intersection node 652 of this coordinates-of-position string to the road link 620 in the conversion recipient map data 108, it is possible to specify a road section that corresponds to this coordinates-of-position string.

The case #4 shown in FIG. 6D is an example in which road links 6101 and 6102 in the map data 106 that is the conversion source correspond to road links 6201, 6202, and 6203 in the conversion recipient map data 108. The road link 6101 connects between an intersection node 651 and an interpolated point node 6501, and the road link 6102 connects between the interpolated point node 6501 and an intersection node 652. The road link 6201 connects between an intersection node 661 and an interpolated point node 6601; the road link 6202 connects between the interpolated point node 6601 and an interpolated point node 6602; and the road link 6202 connects between the interpolated point node 6602 and an intersection node 662. In a similar manner to the case #3, in this case #4 as well, since road sections having the same intersection nodes are present in both of the sets of map data, accordingly the establishment of correspondence between those road sections is successful.

The case #5 shown in FIG. 6E and the case #6 shown in FIG. 6F are both cases in which decoding errors occur, since the configurations of the intersection nodes in the two sets of map data are different, and no road sections are present that have the same intersection nodes as their end points. The case #5 shows a case in which the road link in the map data 106 that is the conversion source and has intersection nodes at both its ends and that connects between them is more detailed than the conversion recipient map data 108. In the conversion source map data 106, a road link 611 that connects between an intersection node 651 and an intersection node 653 and a road link 612 that connects between the intersection node 653 and an intersection node 652 are included in the road section that connects between the intersection nodes 651 and 652. However, in the road link 620 that connects between intersection nodes 661 and 662 of the conversion recipient map data 108, no node is present that corresponds to the intersection node 653 of the conversion source map data 106.

And the case #6 shows a case in which road links that have intersection nodes at both their ends and that connect between those intersection nodes are different in the conversion source and in the conversion recipient. In the conversion source map data 106, a road link 611 that connects between intersection nodes 651 and 653 and a road link 612 that connects between the intersection node 653 and an intersection link 652 are included in the road section that connects between the intersection nodes 651 and 652. And, in the conversion recipient map data 108, a road link 621 that connects between intersection nodes 661 and 663, a road link 622 that connects between the intersection node 663 and an intersection node 664, and a road link 623 that connects between the intersection node 664 and an intersection node 662, are included in the road section that connects between the intersection nodes 661 and 662.

In the case #5, while there are differences in the amount of detail of the road sections, since the same road is present in both the map data, accordingly it is possible to establish a correspondence between the two road link strings by re-decoding processing in which the road sections that are the decoding processing units are adjusted. And in the case #6, when similar re-decoding processing to that performed in the case #5 is performed, it is possible to establish a correspondence between the road link strings by performing similar route search processing to that performed for the case #2.

Figure 8:
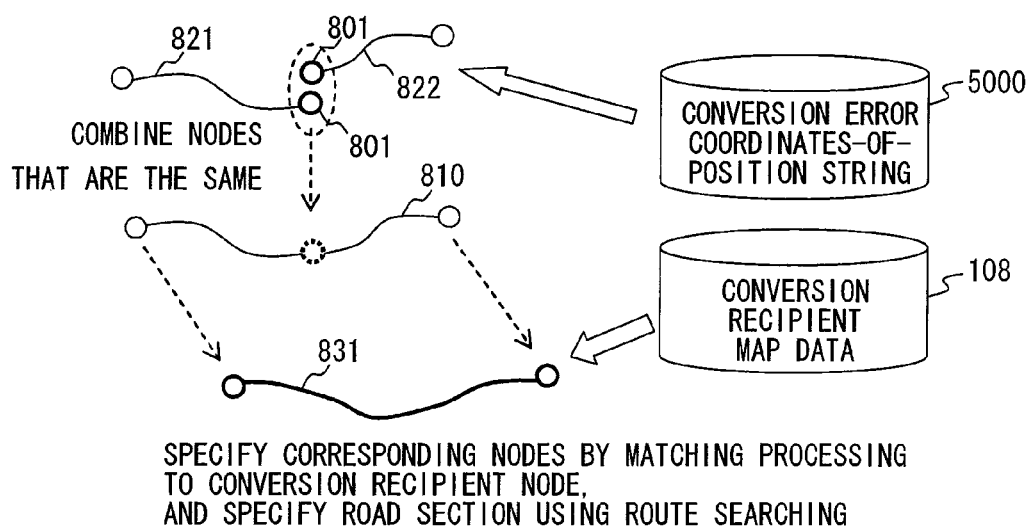
FIG. 8 is a supplementary figure for additional explanation of FIG. 7.

FIG. 7 is a flow chart showing the flow of re-decoding processing performed by the decoding processing unit 111 upon a coordinates-of-position string in which a decoding error has occurred due to the cases #5 and #6 described above, and that has been stored in the conversion error coordinates-of-position string 5000. This re-decoding processing shown in FIG. 7 is a subroutine of the step S5010 of FIG. 5. And FIG. 8 is a supplementary figure for further explanation of the re-decoding processing of FIG. 7, and shows processing in which the road links 611 and 612 of the conversion source in the cases #5 and #6 shown in FIGS. 6E and 6F are combined via the same intersection node 653. This re-decoding processing will now be explained in the following with reference to FIGS. 7 and 8.

After the sequence of decoding processing steps shown in FIG. 5 (i.e. the steps S5001 through S5009) has been executed, if there is a coordinates-of-position string for which there is a decoding error in the conversion error coordinates-of-position string 5000 (YES in a step S701), then this coordinates-of-position string is read in (a step S702). A search is made for whether or not a coordinates-of-position string making up the road link 822 that is connected to the road link 821 given by this coordinates-of-position string is stored in the conversion error coordinates-of-position string 5000 (a step S703). While it is possible to decide whether or not there is a road section in which the road link 822 connected here is connected to the road link 821 by comparing the coordinate values of the end points of the road link 821 and the road link 822, here, the end point nodes of the road links 821 and 822 are matched to road nodes of the conversion recipient map data 108, and are compared by node numbers. Even if the node numbers are different, it is possible to perform matching on the basis of the position coordinates of the nodes, the intersection names carried by the nodes, or node properties such as links within respective intersections denoted by the nodes, and so on. Locations for which matching is not possible are excluded as subjects for processing.

If a same node is found (a step S704), a new coordinates-of-position string is created that has that node as a connection point (i.e. an intermediate location). For example, if a road link 821 and a road link 822 share the same node 801 (YES in the step S704), then a coordinates-of-position string is generated (a step S705) including a road link string 810 that has the node 801 as an intermediate location. A link is sought that connects between each location of that road link string 810 from its start point via its intermediate locations to its end point (i.e. each location making up the coordinates-of-position string that gives the road link string 810), and a road link string 831 of conversion recipient map data 108 that corresponds to that road link string 810 is obtained (a step S706). If no route has been found (YES in a step S707), then a new coordinates-of-position string is created by searching for a road link that has the same nodes as that road link string 810, and similar processing to that described above, i.e. specification of a road link string of the conversion recipient map data, is executed (in the steps S703 through S707). If in the step S707 a route is obtained, then a decode table is recorded in the decode data 112 (a step S708) in which the road link numbers and the coordinates-of-position string data corresponding to that route are put into correspondence with the link numbers of the conversion source, and similar processing is repeated for all of the coordinates-of-position strings (a step S709). When an affirmative decision is reached in the step S709, then the re-decoding processing shown in the step S5010 of FIG. 5 comes to an end.

FIGS. 9A and 9B show examples of the data formats for the data stored in the encode data 110 and the decode data 112.

FIG. 9A shows an example of the data format of the encode table 901 stored in the encode data 110. "Mesh code" is the code of the mesh in which the road link corresponding to "road link number of conversion source" is present. "Road link number of conversion source" is the road number that is allocated to each road link in the road link management of the map data 106. The road link of the conversion source is identified by an encoded conversion link ID. Road link numbers LO1 and LO2 of the conversion source correspond to an encoded conversion link EID-1. Due to the re-decoding processing shown in FIGS. 7 and 8, it is specified that the end point node of the road link that corresponds to the road link number LO1 and the start point node of the road link that corresponds to the road link number LO2 agree with one another. These nodes that agree with one another are taken as intermediate locations, and a new coordinates-of-position string is created that corresponds to a road link string by which the road links of the road link numbers LO1 and LO2 of the conversion source are connected together. The road link of a road link number LO3 of the conversion source corresponds to an encoded conversion link EID-2. Each of the road links of the road link numbers LO1 through LO3 of the conversion source is included in the mesh of the mesh code M1. By the encoding processing unit 109, the road link that corresponds to each of the road link numbers LO1 through LO3 is given by a coordinates-of-position string, and this coordinates-of-position string is made to correspond to a road link number in the conversion source. If property information such as a road classification or the like corresponding to that road link exists, then this property information is also included in the encode table 901 as attached information for that coordinates-of-position string.

If the encoded conversion link ID is EID-1, then, on the basis of the position coordinates (X1, Y1) and (X2, Y2) of the start and end point nodes of the road link of the road link number LO1 of the conversion source, the property information C1 and C2, the position coordinates (X2, Y2) and (X5, Y5) of the start and end point nodes of the road link of the road link number LO2 of the conversion source and also its auxiliary locations (X3, Y3) and (X4, Y4), and the property information C3, C4, and C5, the "coordinates-of-position string and property information" becomes "(X1, Y1, C1)+(X2, Y2, C2)+(X3, Y3, C3)+(X4, Y4, C4)+(X5, Y5, C5)". And if the link ID is EID-2, then, on the basis of the position coordinates (X6, Y6) and (X7, Y7) of the start and end point nodes of the road link of the road link number LO3 of the conversion source, and the property information C6 and C7, the "coordinates-of-position string and property information" becomes "(X6, Y6, C6)+(X7, Y7, C7)". Property information such as, for example, NULL is assigned to nodes or auxiliary locations to which no property information is appended. The road link string of the encode table 901 is created in this manner.

FIG. 9B shows an example of the data format for the data in the decode table 902 stored in the decode data 112. This decode table 902 includes road link numbers of the conversion recipient that correspond to road link strings created in the encode table 901. These road link numbers of the conversion recipient are road link numbers managed by the conversion recipient map data 108. As described above, in the decoding processing (including the re-decoding processing) sometimes it happens that a plurality of road links of the conversion source and a plurality of road links of the conversion recipient correspond to one another.

If the decoded conversion link ID is DID-1, then the encoded conversion link ID "EID-1" corresponds to the road link numbers LC1, LC2, and LC3 of road links of the conversion recipient. As shown in FIG. 9A, the road link numbers LO1 and LO2 of road links included in the conversion source road link string that belongs to the mesh code M1 correspond to the encoded conversion link ID "EID-1". At this time, as shown in FIG. 9B, the "coordinates-of-position string and property information" becomes "(X1, Y1, C1)+(X2, Y2, C2)+(X3, Y3, C3)+(X4, Y4, C4)+(X5, Y5, C5)". And, if the decoded conversion link ID is DID-2, then there is a correspondence between one road link of the conversion source (the encoded conversion link ID "EID-2" to which the road link number LO3 corresponds) and one road link of the conversion recipient (the road link number LC4), and similar information is managed to that in the case when the decoded conversion link ID is DID-1.

Figure 10:
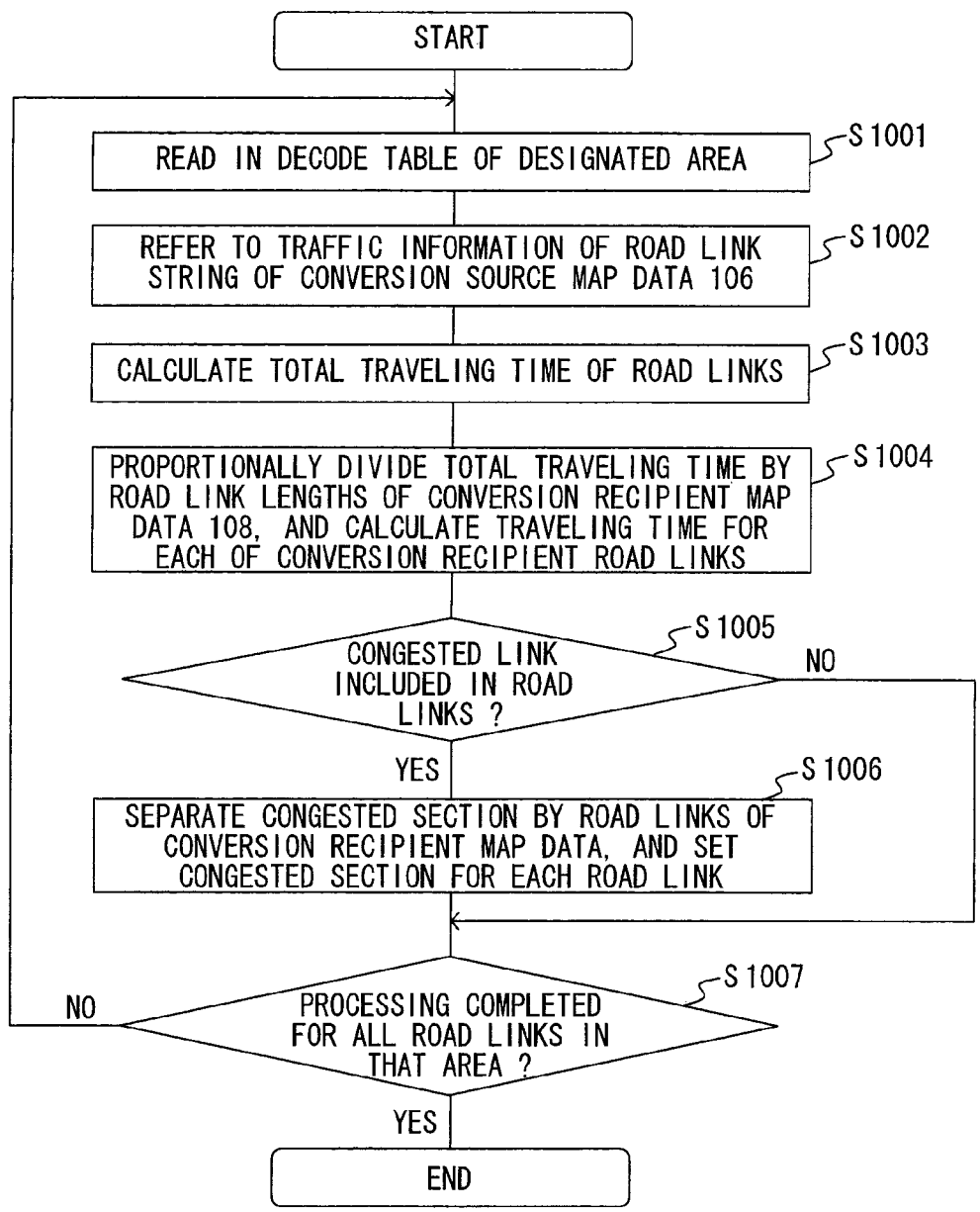
FIG. 10 shows a flow of traffic information editing performed by the server device of the road information providing system according to the first embodiment, for explanation of allotment of traffic information corresponding to road links of the conversion recipient map data.
Figure 11:
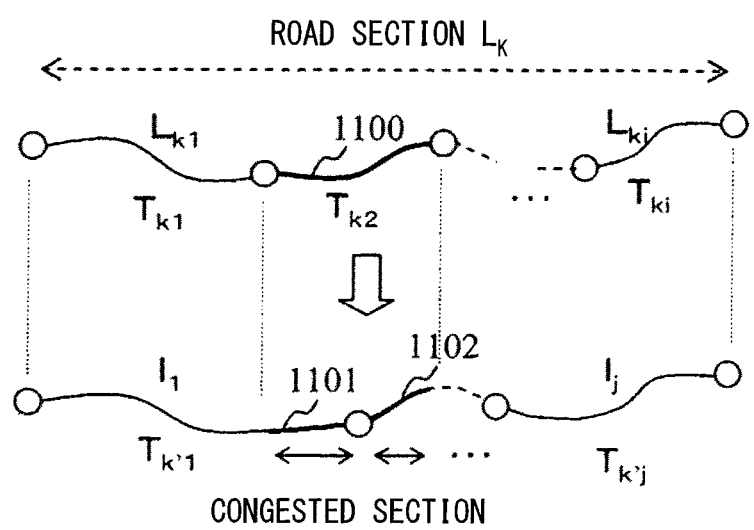
FIG. 11 is a supplementary figure for additional explanation of FIG. 7.

FIG. 10 shows the flow of traffic information editing processing, and shows the procedure performed by the information providing unit 107 for allotting road information held by the server, including traffic information and route information, to road links of the terminal map data, and for transmitting the result. Using this FIG. 10, one particular example will be explained of editing processing to make traffic information stored in traffic information data base 114 as traffic information based upon road links of the map data 106 become traffic information based upon road links of the terminal map data 518. And FIG. 11 is a supplementary figure for further explanation of the processing of FIG. 10. The editing processing of traffic information will now be explained in the following, using FIGS. 10 and 11.

The information providing unit 107 reads (a step S1001) the decode table of the area designated from the decode data 112, on the basis of the terminal requested information received by the terminal request reception unit 104, and establishes correspondence with the traffic information for each decoded conversion link ID. And reference is made in the external information data base 103 or in the traffic information data base 114 to the traffic information for the road link string corresponding to the road link number of the conversion source, and the traveling time for each road link included in the road link string is acquired (a step S1002). The traveling times $T_{ki}$ of the road links $L_{ki}$ are added up on the basis of Equation (1), and thereby the traveling time $T_k$ of each road link $L_k$ is calculated (a step S1003). These traveling times $T_{k1}, \ldots T_{ki}$ are the traveling times on the road links $L_{k1}, \ldots L_{ki}$ of the map data 106 of the conversion source that are included in the road section $L_k$.

$$T_k = \sum_i T_{ki} \quad (1)$$

Here, if it is possible to travel along these road sections in both directions, then the traveling time for that road section is calculated for each direction, since a traveling time exists for both the forward direction and the reverse direction. A flag is set to correspond to each of these traveling times, showing for which direction it is the traveling time. Using the link lengths $l_j$ for the road links of the conversion recipient map data 108 corresponding to the above road sections $L_k$, the total traveling time $T_k$ that has been calculated for the above road section $L_k$ is divided proportionally on the basis of Equation (2), and a traveling time $T_{k'1}$ of each road link $L_{k'1}$ of the conversion recipient map data is set (a step S1004). These link lengths $l_k, \ldots l_j$ are the link lengths of each road link of the conversion recipient map data.

$$T_{k'1} = \frac{l_1}{\sum_j l_j} \cdot T_k \quad (2)$$

If a congested link (including a congested section) is included in that road section (YES in the step S1005), then the section in which congestion is occurring is separated by conversion recipient road links, and a congested section is set for each road link (a step S1006). For example, as shown in FIG. 11, a road link 1110 in the map data before conversion that is congested is divided into congested sections 1101 and 1102 in the road links of the map data after conversion. The distance from the link end point to the congested section, and the length of the congested section, are set as congested section information for that road link. Conversion to road links of the conversion recipient map data, and allocation of traffic information corresponding to the road links after conversion, are performed for all of the road links included in the designated area, and then this processing terminates (a step S1007). It should be understood that, in the correspondence of traffic information to each decoded conversion link ID, it would also be acceptable to use average speed instead of traveling time.

According to this first embodiment as described above, the road information providing system of the present invention provides beneficial operational effects as detailed below.

(1) Since the road information acquired from the server device is effectively taken advantage of by the terminal device, accordingly it is possible for road link strings to be shared between maps that differ from one another. Therefore it is possible to perform establishment of correspondence of road links while keeping the burden upon the terminal device low.

(2) If, in the prior art, with the map held by the server device and the terminal map being different, no road section was found corresponding to some coordinates-of-position string, then it was decided that this was a road section for which no map data existed in the terminal map, such as a newly constructed road or the like. That road section was considered as a discordant link, and the road information attached to that road section was not used. However, with the present invention, with maps that are different from one another, it is arranged to direct attention to the intersection nodes, and to give consideration to differences in the road section structure for the same road. Accordingly it is possible to reduce the number of discordant links, and the success ratio for conversion to road link strings of the terminal map is enhanced. Due to this, this navigation device is able more effectively to employ the road information sent from the server device, and the road information provided from the server device is correctly expressed upon the map of the navigation device, and so on. In other words, the communication cost is reduced that is required when the most up-to-date road information held by the server device is received and used by the navigation device, that has map data that is different from that of the server device. Moreover, since more road sections are specified in common between the two different maps that are held by the navigation device and by the server device, accordingly the processing load upon the navigation device related to the link conversion that it performs is alleviated.

Second Embodiment

Figure 12:
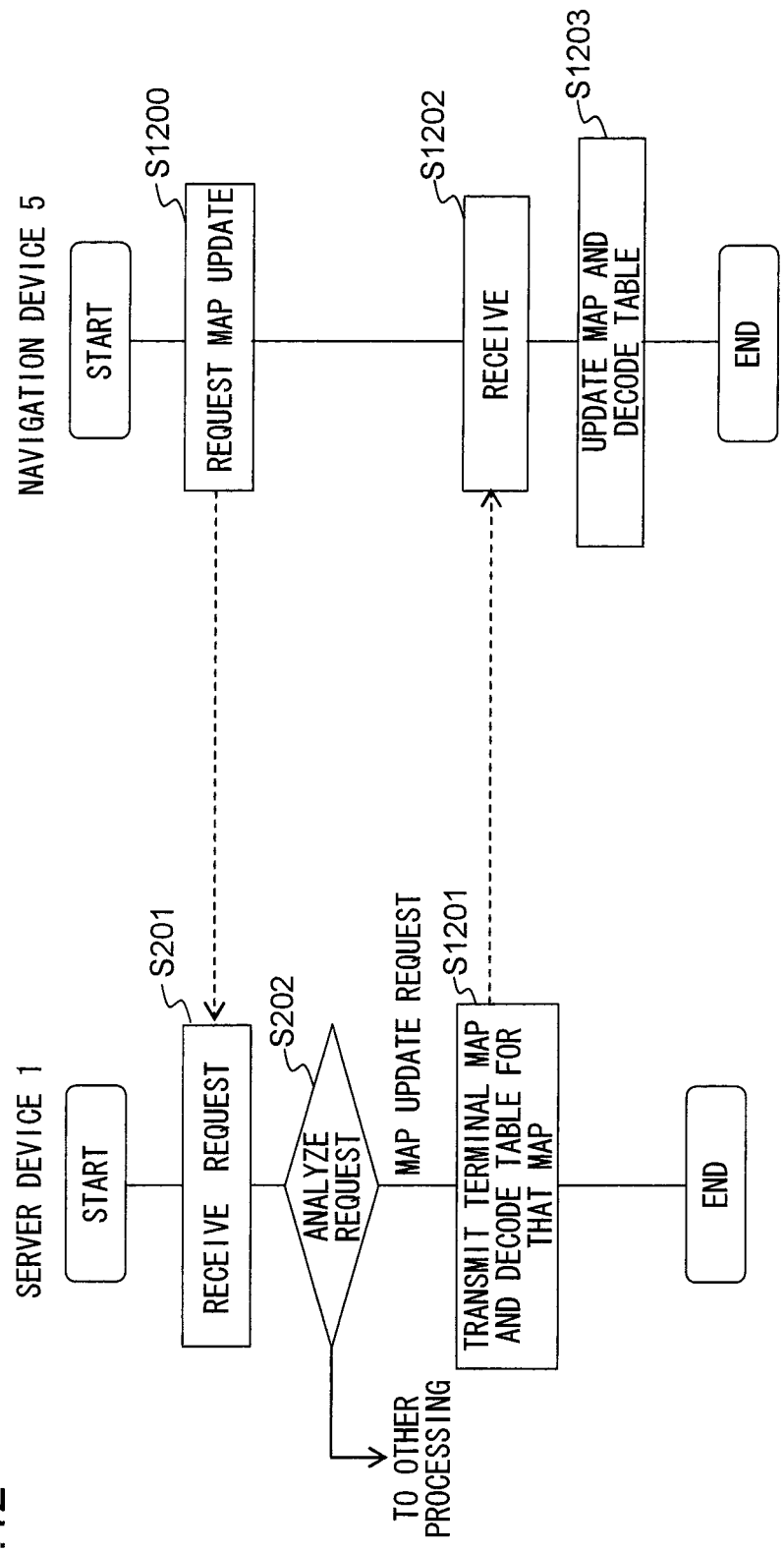
FIG. 12 relates to a road information providing system according to a second embodiment of the present invention, and is a flow chart for explanation of a processing flow by which a server device transmits map update data and a decode table generated by the server device to a navigation device, and for explanation of a processing flow of an updating procedure for terminal map data and for a decode table by the navigation device.

A road information providing system according to a second embodiment of the present invention will now be explained. This road information providing system includes a road information providing device and at least one terminal device. In this embodiment, it is supposed that the road information providing device is a server device, and that the terminal device is a navigation device. FIG. 12 shows a flow of processing for map updating, in which processing is performed for a server device 1 to transmit map update data and a decode table constructed by the server device 1 to a navigation device 5. To processing steps that are similar to ones shown in FIG. 2, the same reference symbols are appended.

In this embodiment, a map update request command for updating the map data 518 is created by the navigation device 5, and this map update request command is transmitted to the server device 1 (a step S1200). The server device 1 receives this map update request command from the navigation device 5 (a step S201), and analyzes that map update request command (a step S202). When the server device 1 decides that the contents of that map update request command is a map update request, it transmits to the navigation device 5 map update data corresponding to that map update request, and the decode table that corresponds to that map update data (a step S1201), and then this map update processing terminates. And, when the navigation device 5 receives this map update data and decode table (a step S1202), along with updating the terminal map data 518, it also stores this decode table in correspondence to that terminal map data 518 (a step S1203), and then this map updating processing terminates.

Figure 13:
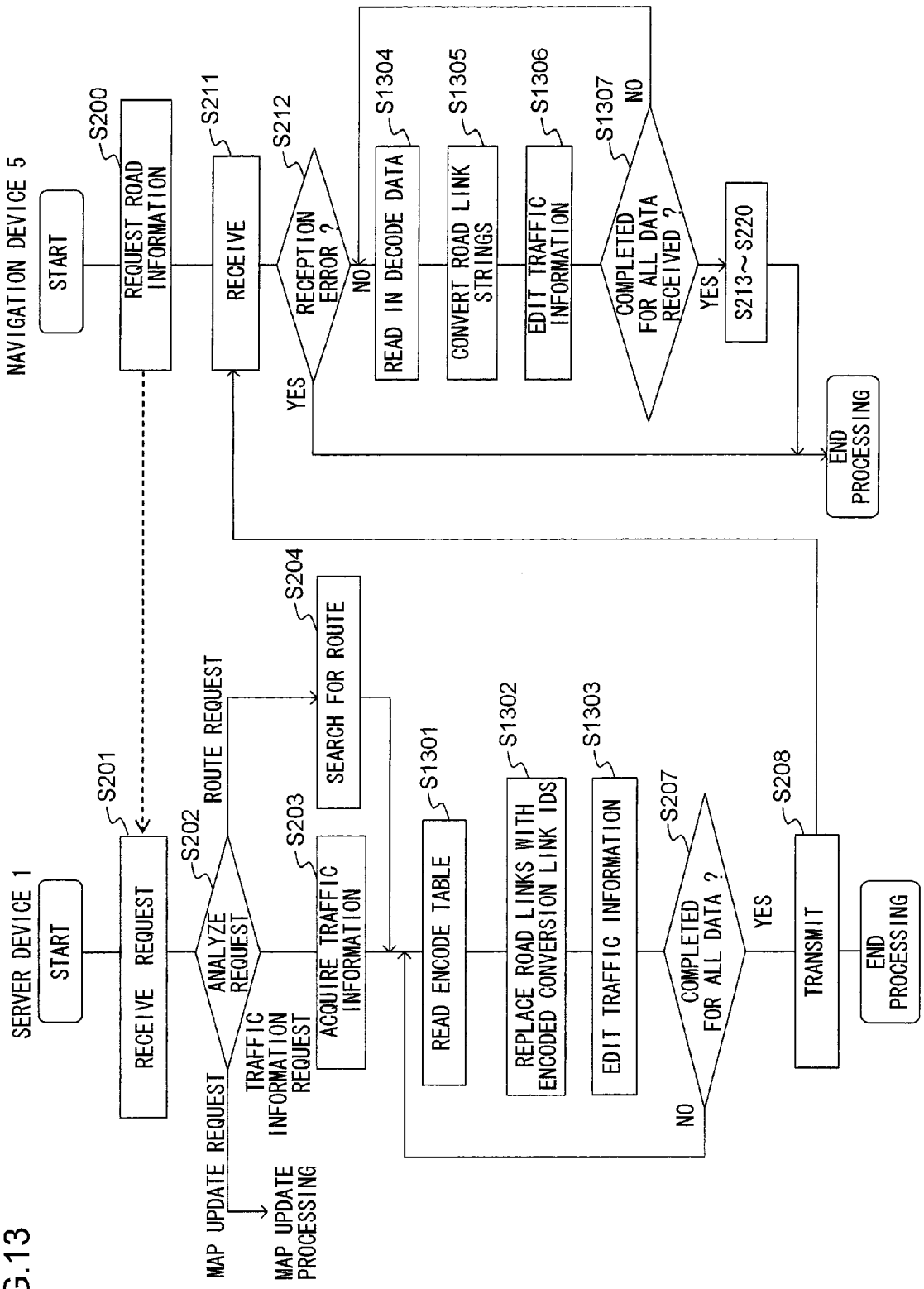
FIG. 13 relates to the navigation device of the road information providing system according to the second embodiment of the present invention, and is a flow chart for explanation of a processing flow by which road information generated by the server device is transmitted to the navigation device, and for explanation of a processing flow by which road information obtained from the server device is converted into a terminal map data road link string using a decode table provided in advance from the server device.

FIG. 13 is a flow chart for explanation of the overall flow of processing, using the decode table stored in the step S1203 of FIG. 12, for establishing correspondence between road links of the terminal map data and road information, including traffic information or route information, provided from the server device 1, in order to implement terminal functions such as display upon a terminal map and guidance and so on. Since this processing corresponds to a variant embodiment of the overall processing flow shown in FIG. 2, to processing steps that are the same as or similar to ones shown in FIG. 2 the same reference symbols are appended, and duplicated explanation is omitted.

When transmitting traffic information or route information, the server device 1 refers to the encode data 110, and reads in the map and the encode table of the area designated from the terminal (a step S1301). The server device 1 replaces the road links of the map data 106 with the encoded conversion link IDs (a step S1302), and creates road information corresponding to those encoded conversion link IDs (a step S1303). And, upon receipt of the encoded conversion link IDs and the road information corresponding thereto, the navigation device 5 reads in the decode table that was acquired and stored in the step S1203 shown in FIG. 12 (a step S1304). Then the navigation device 5 replaces the above encoded conversion link IDs with the road links of the terminal map data 518 (a step S1305), and edits the road information corresponding to those road links (a step S1306). And the navigation device 5 repeats this road link replacement processing and the editing processing for the road information corresponding thereto for all of the encoded conversion link IDs and road information that it has received (a step S1307). When an affirmative decision is reached in the step S1307, the navigation device 5 executes the processing shown in the steps S213 through S220 of FIG. 2, in other words executes processing to display the road information that has been received upon a terminal map and processing to employ it for guidance and so on, and then this processing terminates.

By establishing a correspondence between the encoded conversion link IDs to the road link strings of the terminal map data 518 of the navigation device 5 in this manner, when generating and transmitting the decode table, the server device 1 is able to assign the road information to the encoded conversion link IDs to which the road link strings are in correspondence, and to transmit it. In other words it becomes unnecessary, when transmitting the road information, to identify the map data held by the navigation device 5 that is the recipient, and to convert the road links to match that map data. Accordingly, the processing load upon the server device during transmission can be alleviated. Moreover, since the road information is allocated to each encoded conversion link ID, in other words to each road link string, it is possible to reduce the size of the distributed data to less than what it would be if the road information were allocated to each road link. Yet further, since the encoded conversion link IDs are allocated in sequence, accordingly no numbers are skipped over. Thus, by employing the road link numbers in sequence, the distributed data can be structured on the basis of the leading road link number, the number of road links continuing on from that leading road link number, and the same number of items of road information as the number of links. By doing this, it becomes unnecessary to transmit road link numbers for all of the road links that are distributed, so that it is possible further to reduce the size of the distributed data.

Figure 14:
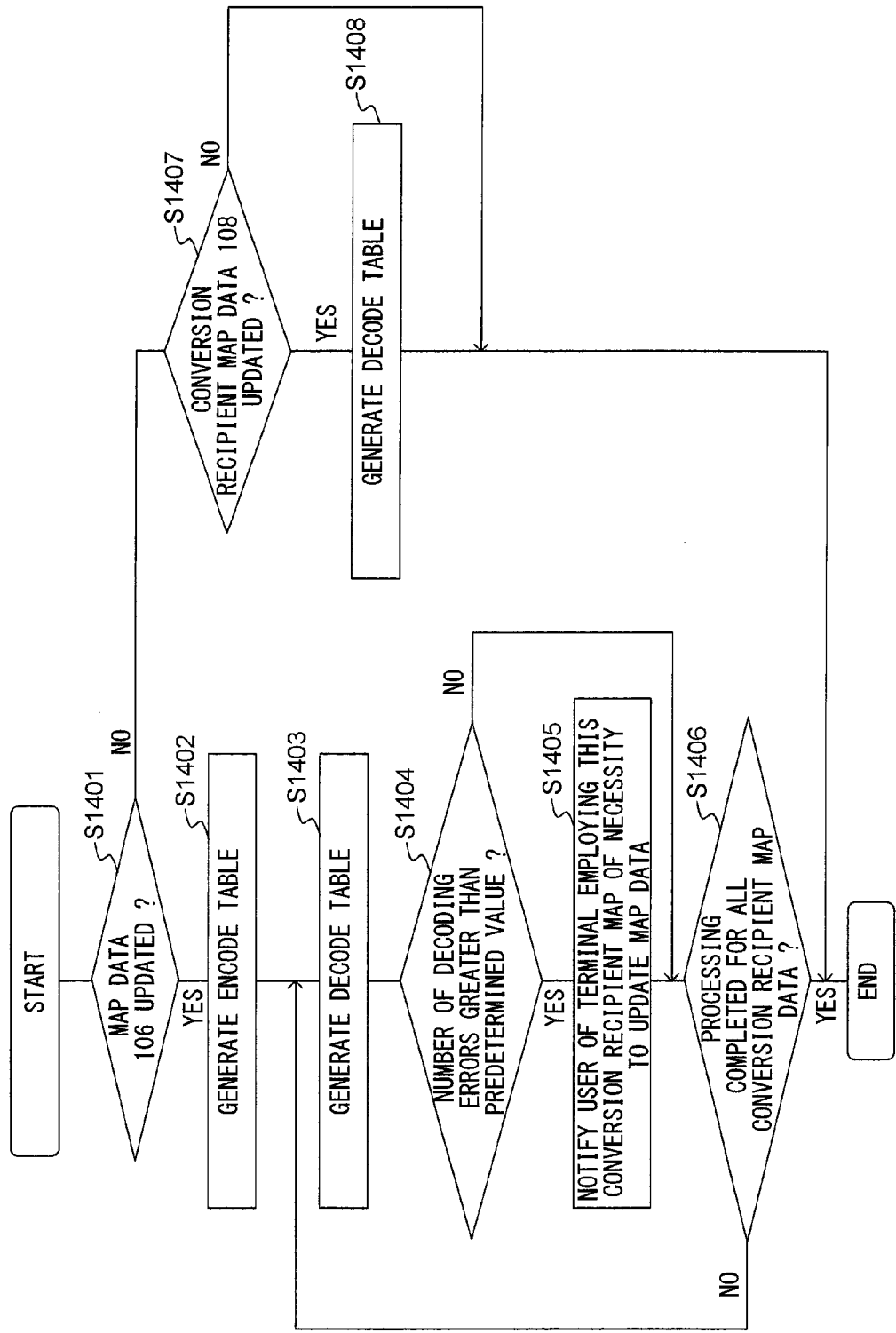
FIG. 14 is a flow chart for explanation of a processing flow for updating an encode table and a decode table along with a map data update in the server device, and also for explanation of a processing flow by which it is decided whether or not it is necessary to update the terminal map data.

FIG. 14 is a flow chart for explanation of a encode table generation and decode table generation processing flow for, upon updating of the map data 106 of the server device 1, generating an encode table in which encode data 110 is stored and a decode table in which decode data 112 is stored, and for determining whether or not it is necessary to update the terminal map data 518. The server device 1 is further provided with a map data update unit not shown in the figures, and this processing is performed by this map data update unit.

When the map data 106 or the conversion recipient map data 108 has been updated, the encoding processing unit 109 and the decoding processing unit 111 generate a new encode table and decode table corresponding to the updated map data 106 or conversion recipient map data 108. Now, even if the conversion recipient map data 108 is updated, it is still necessary for the server device to keep the decode table that corresponds to the past map version for a predetermined period of time, since the terminal map data 518 may not be updated. However, when the divergence in the server 1 between the map data 106 and the terminal map data 518 is great, the road information that is distributed is hardly used by the navigation device 5, and as a result the user may also consider that he is being forced to pay a useless communication cost. Due to this, this processing is used for inviting the user to perform map updating, so as to make it possible for the road information provided by the server device 1 to be employed effectively.

First, when the server device 1 updates the map data (a step S1401), encoding processing is executed to convert the map data 106 that has been updated into coordinates-of-position strings and to generate an encode table, and the encode data 110 is stored (a step S1402). Then decoding processing is executed to establish correspondence of this encode table that has been generated to the conversion recipient map data 108 and to generate a decode table, and the decode data 112 is stored (a step S1403). At this time, the coordinates-of-position strings in the conversion recipient maps for which conversion error coordinates-of-position strings 5000 are found and for which it has not been possible to establish correspondence even by using re-decoding processing are totalized, and a decision is made as to whether or not the totalized number of coordinates-of-position strings is greater than a predetermined number (a step S1404). And, for a navigation device 5 having map data of the same type and the same version as the conversion recipient map for which an affirmative decision has been reached, when road information is provided to that navigation device 5 by a road information request having been received from that navigation device 5, a notification is issued (a step S1405) to the user of this navigation device 5 inviting him to update the map data 518, by information being included in the road information that is returned. It would also be acceptable to arrange, when a road information request has been received from some other terminal device having a terminal map of the same type and the same version as the map data 518 of the navigation device 5 as well, to provide to that terminal device, in a similar manner, information inviting the user to update that terminal map, included in the road information. If a negative decision is reached in the step S1404, then the step S1405 is skipped. And then a decision is made as to whether or not decode table generation processing has been performed for all of the conversion recipient map data (a step S1406). If an affirmative decision is reached, then this processing flow terminates, but if a negative decision is reached, then the flow of control returns to the step S1403.

When not the map data 106, but the conversion recipient map data 108 has been updated (YES in the step S1407), then a decode table is generated for all of the road links of the map data 106 and the conversion recipient map data 108 (a step S1408), and then this processing flow terminates. But if a negative decision is reached in the step S140, then the step S1408 is skipped, and this processing flow terminates.

In the step S1404, it would also be acceptable to arrange for it to be possible for the flow of control to proceed to the step S1405 and to transmit a notification to the navigation device 5 inviting the user to update the map data 518, when the type and version of the map included in the requested information from the navigation device 5 and the type and the version of the decode data 112 do not agree with one another, instead of upon detection of a decoding error.

According to these embodiments as described above, with the road information providing system of the present invention, the server device 1 provides road information, including traffic information or route information, to the navigation device 5 upon which a map is installed that is different from the one on the server device 1. At this time, the server device 1 converts the information into a road link string for the map on the navigation device 5, appends road information to this road link string that has been converted, and transmits the result to the navigation device 5. Due to this, it is not required for the navigation device 5 to perform decoding processing for establishing correspondence of the road information obtained from the server device to road links of the map data of the navigation device. Accordingly, the navigation device 5 does not give any feeling to the user of delay in response due to decoding processing, while still being adapted to be capable of receiving various types of road information from the server device 1 such as traffic information and so on. Moreover it is possible to reduce the cost of communication, since the server device 1 provides road information on the basis of the road link string for the map data that is utilized by the navigation device 5.

Furthermore, in the processing to convert the road link strings, processing is performed to establish correspondence of road link strings expressed as coordinates-of-position strings into road link strings using data of a designated map. And a coordinates-of-position string made up from road link strings for which it has not been possible to establish a correspondence in this manner is recorded, a new coordinates-of-position string is constructed by combining the recorded coordinates-of-position strings, and the processing to establish a correspondence of this new coordinates-of-position string to a road link string for the map data is repeated. By doing this, it is possible to enhance the efficiency of conversion (i.e. the success ratio of conversion) into terminal map data. Accordingly, this navigation device 5 is adapted to be able to utilize the road information provided from the server device 1 in a more effective manner.

In the first embodiment of the present invention described above, the server device 1 generates the decode data 112 (and the data format of the decode data 112 is given in the encode table 902). And, on the basis of this decode data 112, the server device 1 converts the road links included in the contents information (i.e. the road information) of the traffic information or the like into road links of the map data 518 held by the navigation device 5. Moreover, the server device 1 distributes contents information (i.e. road information) of the traffic information or the like on the basis of the road links that have thus been converted. However, in the second embodiment of the present invention described above, the server device 1 distributes the decode table of the decode data 112 that has been generated to the navigation device 5 in advance. And the navigation device 5 converts this road information that has been transmitted from the server device 1 into road links corresponding to the map data 518 by using this decode table. Moreover, according to the map update notification in the step S1405, the server device 1 newly provides to the navigation device 5 map update data for the map data 518 of the navigation device 5 and a decode table for the decode data 112. And since, along with updating the map data 518 on the basis of the map update data, the navigation device 5 also updates the decode table that is distributed in advance on the basis of the decode table that has been newly provided, accordingly it is possible always to utilize contents information (i.e. road information) corresponding to new maps.

The above described embodiments are examples, and various modifications can be made without departing from the scope of the invention.

What is claimed is:

1. A road link string conversion method executed by a computer, in which a road link string conversion process converts a first road link string included in first map data stored by a storage device, into a second road link string included in second map data, different from the first map data, stored by the storage device, comprising:

deciding whether or not first coordinates-of-position strings of the first road link string correspond to second coordinates-of-position of the second map data by comparing first coordinates-of-position of the first coordinates-of-position strings to the second coordinates-of-position of the second map data;

constructing a second coordinates-of-position string by combining together a part of the first coordinates-of-position strings, representing a plurality of road links, decided as not corresponding to the second coordinates-of-position of the second map data;

obtaining the second road link string by searching a route from a start node to an end node of the plurality of road links, corresponding to the second coordinates-of-position string, in the second map data; and converting the first road link string, including the plurality of road links, into the second road link string.

2. A road link string conversion method according to claim 1, wherein:

the part of the first coordinates-of-position strings decided as not corresponding to the second coordinates-of-position include coordinates of position not corresponding to nodes of the second road link string, or coordinates of position for which, although corresponding to nodes of the second road link string, a failure has occurred in route searching between the nodes; and the second coordinates-of-position string includes coordinates of position that correspond to nodes corresponding to the second road link string, for which route searching between the nodes has been successful.

3. A road link string conversion method according to claim 1, wherein:

the second coordinates-of-position string includes a coordinates-of-position string to which a plurality of coordinates-of-position strings, corresponding to the part of the first coordinates-of-position strings decided as not corresponding to the second coordinates-of-position, are combined using identical coordinates of position among the plurality of coordinates-of-position strings.

4. A road information providing device, comprising:

a storage unit that stores first map data and second map data that is different from the first map data;

a road link string data conversion unit that decides whether or not first coordinates-of-position strings of first road link string included in the first map data correspond to second coordinates-of-position of the second map data by comparing first coordinates-of-position of the first coordinates-of-position strings to the second coordinates-of-position of the second map data, and, by constructing a second coordinates-of-position string, in which a part of the first coordinates-of-position strings, representing a plurality of road links, decided as not corresponding to the second coordinates-of-position of the second map data are combined together, obtains a second road link string by searching a route from a start node to an end node of the plurality of road links, corresponding to the second coordinates-of-position string, in the second map data, and converts the first road link string, including the plurality of road links, into the second road link string;

a road information editing unit that edits second road information corresponding to the second road link string by first road information corresponding to the first road link string being converted by the road link string data conversion unit; and a road information distribution unit that distributes the second road information.

5. A road information providing device according to claim 4, wherein:

the road information editing unit calculates a traveling time or an average speed for each second road link corresponding to the second road link string by converting a traveling time or an average speed, obtained based upon the first road information, of each first road link included in the first road link string, with the road link string data conversion unit, and includes the traveling time or the average speed for each second road link that has been calculated in the second road information.

6. A road information providing device according to claim 4, wherein:

if at least one first road link included in the first road link string corresponds to a congested section obtained based upon the first road information, the road information editing unit includes congested section information corresponding to the at least one first road link and corresponding to at least one second road link included in the second road link string by converting the first road information with the road link string data conversion unit, in the second road information.

7. A road information providing system, comprising:

a server device and
a terminal device, wherein:
the server device comprises:
a first storage unit that stores first map data and second map data that is different from the first map data;

an identification information generation unit that decides whether or not first coordinates-of-position strings of a first road link string included in the first map data correspond to second coordinates-of-position of the second map data by comparing first coordinates-of-position of the first coordinates-of-position strings to the second coordinates-of-position of the second map data, and, by constructing a second coordinates-of-position string, in which a part of the first coordinates-of-position strings, representing a plurality of road links, decided as not corresponding to the second coordinates-of-position of the second map data are combined together, generates identification information specifying a correspondence relationship between the first coordinates-of-position strings decided as not corresponding to the second coordinates-of-position and a second road link string obtained by searching a route from a start node to an end node of the plurality of road links, corresponding to the second coordinates-of-position string, in the second map data;

a first road information editing unit that edits second road information by converting first road information corresponding with the first road link string, including the plurality of road links to the identification information based upon the correspondence relationship; and a road information distribution unit that distributes the identification information and the second road information; and the terminal device comprises:

a reception unit that receives the identification information and the second road information distributed from the server device;

a second storage unit that stores the second map data; and a second road information editing unit that edits third road information by putting the second road information in correspondence with the second road link string data based upon the identification information.

8. A road information providing system according to claim 7, wherein:

the server device further comprises:

a counting unit that, when the identification information generation unit has not been able to specify the correspondence relationship, counts a number of second coordinates-of-position strings corresponding to the first road link string; and a notification unit that, if the number of second coordinates-of-position strings counted by the counting unit exceeds a predetermined number, issues a notification to the terminal device inviting the terminal device to update the second map data.

* * * * *